(12) United States Patent
Kano et al.

(10) Patent No.: US 6,377,584 B1
(45) Date of Patent: Apr. 23, 2002

(54) TRANSMISSION EQUIPMENT AND A LOAD-DISTRIBUTION TRANSMITTING METHOD IN THE TRANSMISSION EQUIPMENT

(75) Inventors: Shinya Kano; Akira Chugo; Takashi Sawada, all of Kanagawa; Yasushi Kurokawa, Fukuoka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/116,960

(22) Filed: Jul. 17, 1998

(30) Foreign Application Priority Data

Oct. 13, 1997 (JP) .............................................. 9-279200

(51) Int. Cl.[7] .............................................. H04L 12/54
(52) U.S. Cl. ....................................... 370/423; 370/428
(58) Field of Search ................................. 370/386, 387, 370/388, 389, 390, 392, 422, 423, 424, 426, 428, 429, 412, 413, 414, 415, 416, 417, 418; 710/29, 31, 33, 34, 35

(56) References Cited

U.S. PATENT DOCUMENTS

| | | | | |
|---|---|---|---|---|
| 5,126,999 A | * | 6/1992 | Munter et al. .............. 370/415 |
| 5,416,771 A | * | 5/1995 | Iwata .......................... 370/410 |
| 5,940,596 A | * | 8/1999 | Rajan et al. ............. 340/825.52 |
| 5,982,771 A | * | 11/1999 | Caldara et al. .............. 370/389 |
| 6,101,188 A | * | 8/2000 | Sekine et al. ............... 370/401 |

FOREIGN PATENT DOCUMENTS

| | | |
|---|---|---|
| EP | 0260364 A2 | 3/1988 |
| EP | 0602693 A2 | 6/1994 |
| EP | 0618705 A1 | 10/1994 |
| JP | 63-284950 | 11/1988 |
| JP | 3-266133 | 11/1991 |
| JP | 5-14447 | 1/1993 |
| JP | 8-272703 | 10/1996 |

\* cited by examiner

Primary Examiner—Kwang B. Yao
(74) Attorney, Agent, or Firm—Staas & Halsey LLP

(57) ABSTRACT

A transmission equipment decides in which, when a frame is received from each of networks, an output physical port corresponding to an output logical port decided by a path deciding section is decided by an output physical port deciding section, a transmitting frame is outputted to the output physical port, and when following received frames are successively transmitted, an output physical port number to which a transmitting frame is outputted by a port number increment section is incremented each time a frame is transmitted, and a destination to which a transmitting frame is outputted is switched among output physical ports.

29 Claims, 32 Drawing Sheets

TRANSMISSION EQUIPMENT AND A LOAD-DISTRIBUTION TRANSMITTING METHOD IN THE TRANSMISSION EQUIPMENT

FIELD OF THE INVENTION

The present invention relates to a transmission equipment for transmitting frame through a network via a plurality of I/O physical ports as well as to a load-distribution transmitting method in the transmission equipment.

BACKGROUND OF THE INVENTION

Conventionally, when a band required for frame transmission can not sufficiently be insured because of only one transfer path (physical port) provided between transmission equipments, there has been employed a method for providing a plurality of transfer paths between transmission equipments, dividing information thereinto, and transmitting the divided information; namely a load-distribution transmitting method. FIG. 49 is a block diagram showing configuration of a transmission equipment employing a load-distribution transmitting method based on the conventional technology. A transmission equipment 30 shown in FIG. 49 comprises frame receiving sections 31-0 to 31-10, frame transmitting sections 32-0 to 32-10, a switching section 33, a path deciding section 34, an output physical port deciding section 35, a load distribution table section 36, a load distribution table selecting section 37, an entry pointer table 38, and an entry pointer increment section 39.

Each of the frame receiving sections 31-0 to 31-10 receives a frame from a network connected thereto, and processes the received frame to a frame format in which the frame can be handled in the equipment. Each of those frame receiving sections 31-0 to 31-10 sends out a received frame to the switching section 33 respectively. Each of the frame transmitting sections 32-0 to 32-10 processes a transmitting frame to a format in which the transmitting frame can be outputted to a network connected thereto and sends the processed frame to the network. Here is shown an example of that 11 units of input physical port as well as of output physical port each at reference numerals #0 to #10 are provided in each of the frame transmitting sections.

The frame transmitting sections 32-0 to 32-7 correspond to output physical ports #0 to #7 respectively, and a bundle of the ports (grouping) is defined as a logical port #0. Also, the frame transmitting sections 32-8 and 32-9 correspond to output physical ports #8 and #9 respectively, and a bundle of the ports (grouping) is defined as a logical port #1. The frame transmitting section 32-10 corresponds to an output physical port #10, which is defined as a logical port #2.

The switching section 33 executes processing for switching to transmit a received frame from any frame receiving section having received the frame to any frame transmitting section corresponding to the output physical port number decided by the output physical port deciding section 35. The path deciding section 34 receives the received frame from the switching section 33, decides a path from the destination according to the received frame, and decides an output logical port corresponding to the path. This output logical port is used herein for defining a plurality of transfer paths which are discharging paths as a bundle thereof (grouping).

The output physical port deciding section 35 looks up any load distribution table selected from the load distribution table section 36 by the load distribution table selecting section 37 and decides an output physical port. The load distribution table section 36 is a group of tables in each of which one unit of load distribution table for controlling a correlation of an output physical port (zero unit, one unit or a plurality units) to an output logical port is allocated to each output logical port. Herein, load distribution tables 36-0 (#0) to 36-2 (#2) are prepared for the output logical ports #0 to #2 respectively.

The load distribution table selecting section 37 selects a load distribution table for deciding an output physical port from the load distribution table section 36 according to an output logical port number decided by the path deciding section 34. The entry pointer table 38 is a table in which an entry pointer for identifying a position of which load distribution table of the load distribution table section 36 is to be looked up is correlated to each of the load distribution tables 36-0 to 36-10 respectively.

The entry pointer increment section 39 increments, after any load distribution table is looked up, a current entry pointer in the entry pointer table 38 by one for looking up the load distribution table at the next time.

Next description is made for the operations. FIG. 50 is a simulated view for explaining a load-distribution transmitting method in the normal operation of the equipment according to the example based on the conventional, FIG. 51 is a view for explaining a method of changing an output physical port in the condition shown in FIG. 50, and FIG. 52 is a flow chart for explaining a sequence of load-distribution transmission according to the example based on the conventional technology.

FIG. 50 shows a grouping in the logical port #0 assuming that the transmission equipment 30 and a transmission equipment P as a partner connected thereto via a network are connected to each other with, for example, the same physical port numbers. Description is made hereinafter for a case where a frame is received in the physical port #0.

When a frame is received by the transmission equipment 30 (Frame receiving section 31-0: Physical port #0) from a network (step S61), the received frame is sent from the frame receiving section 31-0 to the path deciding section 34 via the switching section 33. It is assumed herein that the frame received from the network is transmitted by the transmission equipment 30 and transmitted to the transmission equipment P as a partner.

When the received frame is sent to the path deciding section 34, a destination is decided in the path deciding section 34 according to the destination information stored in the received frame, and a logical port number to which information for the received frame is to be outputted is decided according to the destination (step S62). The output logical port number decided by this path deciding section 34 is sent to the output physical port deciding section 35.

The output physical port deciding section 35 executes processing for supplying the output logical port number received from the path deciding section 34 to the load distribution table selecting section 37, and obtaining a load distribution table number to be selected as a response from the load distribution table selecting section 37. At this point of time, the load distribution table selecting section 37 selects, according to the received output logical port number, a load distribution table number corresponding thereto, and responds the load distribution table number to the output physical port deciding section 35.

When the load distribution table number is acquired by the output physical port deciding section 35 as described above, actual selection of the load distribution table is executed by the output physical port deciding section 35 (step S63). Namely, the load distribution table having the load distribution table number is accessed by the output physical port deciding section 35 through the load distribution table section 36. In this example, as a frame is received by the logical port #0, the load distribution table 36-0 (#0) is selected.

Then, in the output physical port deciding section 35, an entry pointer is looked up through the entry pointer table 38 (step S64), and a table entry to be looked up in the load distribution table is specified according to the entry pointer. The output physical port deciding section 35 decides an output physical port by looking up this specified table entry (step S65).

When the output physical port is decided as described above, a transmitting frame is sent out to the output physical port. In this case, as shown in FIG. 51, at first, #0 is decided as an output physical port number according to a first table entry, and for this reason, a first frame is transmitted from the frame transmitting section 32-0 corresponding to the output physical port #0 (step S66).

After the transmission, the entry pointer in the entry pointer table 38 is incremented by one by the entry pointer increment section 39 (step S67). When the frame is transmitted from the output physical port as described above, the processing for deciding the next output physical port is executed for load distribution. Namely, in FIG. 51, because the entry pointer has been incremented by one, the physical port #1 is decided in the same load distribution table 36-0 as the next output physical port according to the next table entry.

Similarly, the entry pointer is incremented each time when a frame is transmitted (output logical port #0), and a physical port is switched from #2 to #7 in association with the increment. It should be noted that, when the switching with the entry pointer reaches the last output physical port #7, the entry pointer returns to the initial value and specifies the output physical port #0.

As described above, in the frame transmission to the logical port #0, load-distribution transmission to received frames is realized using the physical ports #0 to #7. Also, if any frame is transmitted to the logical port #1, the load-distribution transmission similar to the case of the logical port #0 is realized using the physical ports #8 and #9, and if any frame is transmitted to the logical port #2, transmission with one output physical port which indicates no load distribution therein is realized using the physical port #10 (Refer to FIG. 51).

In the example based on the conventional technology, however, like the transmission equipment 30 shown in FIG. 49, when a received frame is to be transferred, an output physical port is decided by switching a load distribution table to be looked up, so that an look-up operation is needed for each frame transmission requiring load-distribution. For this reason, the load increases on the processing for load-distribution transmission, which may interfere with speed-up of frame transmitting.

Also, like the conventional type of transmission equipment shown in FIG. 49, in such configuration that one load distribution table is provided for each logical port, it is required to insure resources (hardware) constituting the load distribution table section 36, and for this reason, a scale of a circuit is larger as increase of the number of logical ports which is required for realizing rapid communications.

It is an object of the present invention, for solving the problems as described above, to provide a transmission equipment which can realize speed-up of a load-distribution transmission with compact circuit configuration not requiring look-up of a load distribution table as well as a load-distribution transmitting method in the transmission equipment.

To solve the problems as well as to achieve the object, a transmission equipment according to the present invention connected to a network for executing communications using a frame including destination information with a plurality of I/O physical ports for transmitting a frame transmission through the network via the plurality of I/O physical ports comprises an output logical port deciding unit for deciding an output logical port with an output physical port previously correlated thereto according to the destination information included, when a frame has been received from the network, in the received frame; an output physical port deciding unit for deciding an output physical port corresponding to the output logical port decided by the output logical port deciding unit; a frame transmitter for transmitting the received frame to the output physical port decided by the output physical port deciding unit; and an output physical port changing unit for changing any output physical port, of the plurality of output physical ports, decided by the output physical port deciding unit according to previously decided rules when received frames following the frame transmitted by the frame transmitter are successively transmitted.

With the transmission equipment according to the present invention, when received frames are to successively be transmitted, change of an output physical port is regularly executed within a plurality of output physical ports corresponding to an output logical port acquired from destination information. For this reason, it is possible to omit operations to look up a table each time when an output physical port with which a load is distributed is changed, so that speed-up of load-distribution transmission can be realized, and in addition, it is not required to insure resources constituting tables for the look-up, and for this reason, it is possible to realize a compact circuit for load-distribution transmission.

A transmission equipment according to the present invention connected to a network for executing communications using a frame including destination information with a plurality of I/O physical ports for transmitting a frame transmission through the network via the plurality of I/O physical ports comprises an output physical port table for storing therein variable output physical port numbers each for identifying any output physical port by corresponding to each of a plurality of previously decided output logical port numbers respectively and mask information for changing the variable output physical port number to distribute loads; an output logical port deciding unit for deciding an output logical port according to the destination information, when a frame has been received from the network, included in the received frame; an output physical port deciding unit for deciding an output physical port number corresponding to the output logical port number decided by the output logical port deciding unit by referring to the output physical port table; a frame transmitter for transmitting the received frame to the output physical port having an output physical port number decided by the output physical port deciding unit; and an output physical port changing unit for changing any output physical port number decided by the output physical port deciding unit according to the mask information correlated to the output logical port number decided by the output logical port deciding unit by referring to the output physical port table when received frames following the frame transmitted by the frame transmitter are successively transmitted.

With the transmission equipment according to the present invention, a plurality of output physical port numbers corresponding to the output logical port number acquired from destination information and mask information for varying any output physical port number of the plurality of output physical port numbers for load distribution are acquired by looking up an output physical port table, and when received frames are to successively be transmitted, change of an output physical port number is executed within a plurality of output physical port numbers corresponding to an output logical port acquired from the destination information. For this reason, it is possible to omit operations to look up a table each time when an output physical port with which a load is distributed is changed, so that speed-up of load-distribution transmission can be realized, and in addition, it is not required to insure resources constituting tables for the look-up, and for this reason, it is possible to realize a compact circuit for load-distribution transmission.

A transmission equipment according to the present invention connected to a network for executing communications using a frame including destination information with a plurality of I/O physical ports for transmitting a frame transmission through the network via the plurality of I/O physical ports comprises an output physical port table with one or a plurality of interface boards each correlated to each of a plurality of previously decided output logical ports provided therein, with a plurality of interface board-ports each provided in each of the interface boards, for deciding a number obtained by combining a board number for each of the interface boards with a corresponding number for a port in each of the plurality of interface boards as an output physical port number, and storing therein a variable output physical port number for identifying any output physical port by corresponding to each of the plurality of output logical port numbers and mask information for changing the variable output physical port number to distribute loads; an output logical port deciding unit for deciding an output logical port number according to the destination information, when a frame has been received from the network, included in the received frame; an output physical port deciding unit for deciding an output physical port number corresponding to the output logical port number decided by the output logical port deciding unit by referring to the output physical port table; a frame transmitter for transmitting the received frame to the output physical port having an output physical port number decided by the output physical port deciding unit; and an output physical port changing unit for changing any output physical port number decided by the output physical port deciding unit according to the mask information correlated to the output logical port number decided by the output logical port deciding unit by referring to the output physical port table when received frames following the frame transmitted by the frame transmitter are successively transmitted.

With the transmission equipment according to the present invention, a plurality of output physical port numbers (numbers each obtained by combining a board number for an interface board and a port number in a plurality of interface boards corresponding to the board number) corresponding to the output logical port number acquired from destination information and mask information for varying any output physical port number of the plurality of output physical port numbers for load distribution are acquired by looking up an output physical port table, and when received frames are to successively be transmitted, change of an output physical port number is executed according to the mask information within a plurality of output physical port numbers corresponding to the output logical port number acquired from the destination information. For this reason, even when a plurality of ports are provided in each of a plurality of interface boards respectively, it is possible to omit operations to look up a table each time when an output physical port with which a load is distributed is changed, so that speed-up of load-distribution transmission can be realized, and in addition, it is not required to insure resources constituting tables for the look-up, and for this reason, it is possible to realize a compact circuit for load-distribution transmission.

In a transmission equipment according to the present invention and also claimed in claim 2 or 3, the mask information defines a range for grouping a plurality of output physical port numbers, and the output physical port changing unit changes the output physical port number decided by the output physical port deciding unit within the range for grouping defined by the mask information.

With the transmission equipment according to the present invention, an output physical port number is changed within a range for grouping defined by the mask information, so that load-distribution transmission in an adequate band insured by the grouping can be realized.

In a transmission equipment according to the present invention, the output physical port changing unit changes output physical port numbers in ascending order or in descending order within the range for grouping.

With the transmission equipment according to the present invention, output physical port numbers are changed in ascending order or in descending order within the range for grouping, so that it is possible to acquire an output physical port number with regularity in changes within the range for grouping as well as a simple operational sequence.

In a transmission equipment according to the present invention, output physical port numbers and mask information stored in the output physical port table are numbers indicated in the same number of digits, and each of the mask information is information for identifying a digit position to be variable for the output physical port number correlated to the mask information.

With the transmission equipment according to the present invention, an output physical port number and mask information each comprise the same number of bits, and a digit position to be variable is specified with each of the mask information to a bit pattern of an output physical port number corresponding to the mask information, so that only an output physical port obtained by change of the digit position to be variable is used, and with this operation, it is possible to realize load-distribution transmission using any output physical port which is surely desired.

A transmission equipment according to the present invention further comprises an equipment-configuration defining detector for detecting change in definition concerning the equipment configuration for the equipment, and a mask information setting unit for changing and setting, when the definition concerning the equipment configuration for the equipment is changed by the equipment-configuration defining detector, mask information corresponding to each of the output logical ports to mask information for defining a range to insure a band for transfer paths adequate for changed contents of the definition concerning the equipment configuration from the range of grouping according to the mask information.

With the transmission equipment according to the present invention, the mask information corresponding to each of output logical ports is changed and set to mask information for defining a range to insure a band for a transfer path adequate for changed contents of the definition concerning the equipment configuration from the range of grouping according to the mask information, so that flexibility can be given to grouping according to the changed contents of the definition concerning the equipment configuration, and with this operation, the higher efficiency of load-distribution transmission can be achieved.

In a transmission equipment according to the present invention, the mask information setting unit enlarges or reduces the range of grouping so as to be a range for obtaining a band according to the changed conditions.

With the transmission equipment according to the present invention, the range of grouping is enlarged or reduced according to changed conditions of definition concerning the equipment configuration, so that a band to be insured can be enlarged or reduced according to enlargement or reduction of the grouping range, and with this operation, the higher efficiency of load-distribution transmission can be achieved.

A transmission equipment according to the present invention further comprises a communication trouble detector for detecting trouble over communications for each output physical port, and a mask information setting unit for changing and setting, when one or a plurality of output physical ports having trouble over communications are detected by the communication trouble detector, mask information corresponding to each of the output logical ports to mask information for defining a range in which the detected one or a plurality of output physical ports have been invalidated from the range of grouping according to the mask information.

With the transmission equipment according to the present invention, the mask information corresponding to each of the output logical ports is changed and set to mask information for defining a range in which one or a plurality of output physical ports each with communication trouble having been detected are invalidated from the range of grouping according to the mask information, so that any output physical port in which communication trouble occurs can be separated from others, and with this operation, communication trouble at the time of load-distribution transmission can securely be avoided.

A transmission equipment according to the present invention further comprises an overload detector for detecting an overloaded state in each output physical port, and a mask information setting unit for changing and setting, when one or a plurality of output physical ports each in an overloaded state are detected by the overload detector, mask information corresponding to each of the output logical ports to mask information for defining a range in which the detected one or a plurality of output physical ports have been invalidated from the range of grouping according to the mask information.

With the transmission equipment according to the present invention, the mask information corresponding to each of the output logical ports is changed and set to mask information for defining a range in which one or a plurality of output physical ports in which an overloaded state has been detected are invalidated from the range of grouping according to the mask information, so that any output physical port at the overloaded state can be separated from others, and with this operation, uniformity of a load at the time of load-distribution transmission can be achieved.

In a transmission equipment according to the present invention, the mask information setting unit changes mask information corresponding to each of the output logical ports to mask information for defining a range of grouping excluding digit positions therefrom corresponding to at least the detected one or a plurality of output physical ports.

With the transmission equipment according to the present invention, the mask information corresponding to each of the output logical ports is changed to mask information for defining a range of grouping excluding digit positions therefrom corresponding to at least one or a plurality of output physical ports in which any communication trouble has been detected, so that a grouping to which any output physical port having communication trouble does not belong can be acquired.

In a transmission equipment according to the present invention, the mask information setting unit changes mask information corresponding to each of the output logical ports to mask information for defining a range with digit positions obtained by moving from the digit positions corresponding to at least the detected one or a plurality of output physical ports as a range of grouping.

With the transmission equipment according to the present invention, the mask information corresponding to each of the output logical ports is changed to mask information for defining a range with digit positions obtained by moving from the digit positions corresponding to at least one or a plurality of output physical ports in which communication trouble has been detected as a range of grouping, so that a grouping not including any output physical port having communication trouble can be acquired.

In a transmission equipment according to the present invention, the communication trouble detector includes recovery from communication troubles in contents to detect thereby, and the mask information setting unit returns, when recovery from communication trouble is detected by the communication trouble detector, the mask information to the original mask information corresponding to each of the output logical ports.

With the transmission equipment according to the present invention, when recovery from communication trouble is detected, the mask information is returned to the original mask information corresponding to each of the output logical ports, so that a correlation between the output logical port and the mask information can be returned to the initial state before the communication trouble occurs, and with this operation, the system on the whole can automatically be recovered.

In a transmission equipment according to the present invention, the overload detector includes elimination of an overload in contents to detect thereby, and the mask information setting unit returns, when elimination of an overloaded state is detected by the overload detector, the mask information to the original mask information corresponding to each of the output logical ports.

With the transmission equipment according to the present invention, when elimination of an overloaded state is detected, the mask information is returned to the original mask information corresponding to each of the output logical ports, so that a correlation between the output logical port and the mask information can be returned to the initial state before the overload occurs, and with this operation, the system on the whole can automatically be recovered.

A load-distribution transmitting method in the transmission equipment according to the present invention connected to a network for executing communications using a frame including destination information with a plurality of I/O physical ports for transmitting a frame transmission through the network via the plurality of I/O physical ports comprises a first step of deciding an output logical port with an output physical port previously correlated thereto according to the destination information included, when a frame has been received from the network, in the received frame; a second step of deciding an output physical port corresponding to the output logical port decided in the first step; a third step of transmitting the received frame to the output physical port decided in the second step; and a fourth step of changing any output physical port, of the plurality of output physical ports, decided in the second step according to previously decided rules when received frames following the frame transmitted in the third step are successively transmitted.

With the load-distribution transmitting method in the transmission equipment according to the present invention, when received frames are to successively be transmitted, the method comprises a step of regularly executing change of an output physical port in a plurality of output physical ports each corresponding to the output logical port acquired from the destination information. For this reason, it is possible to omit operations to look up a table each time when an output physical port with which a load is distributed is changed, so that speed-up of load-distribution transmission can be realized, and in addition, it is not required to insure resources constituting tables for the look-up, and for this reason, it is possible to realize a compact circuit for load-distribution transmission.

Other objects and features of this invention will become understood from the following description with reference to the accompanying drawings.

DESCRIPTION OF THE PREFERRED EMBODIMENTS

Detailed description is made hereinafter for preferred embodiments of the transmission equipment and a load-distribution transmitting method in the transmission equipment according to the present invention with reference to accompanying drawings.

Figure 1:
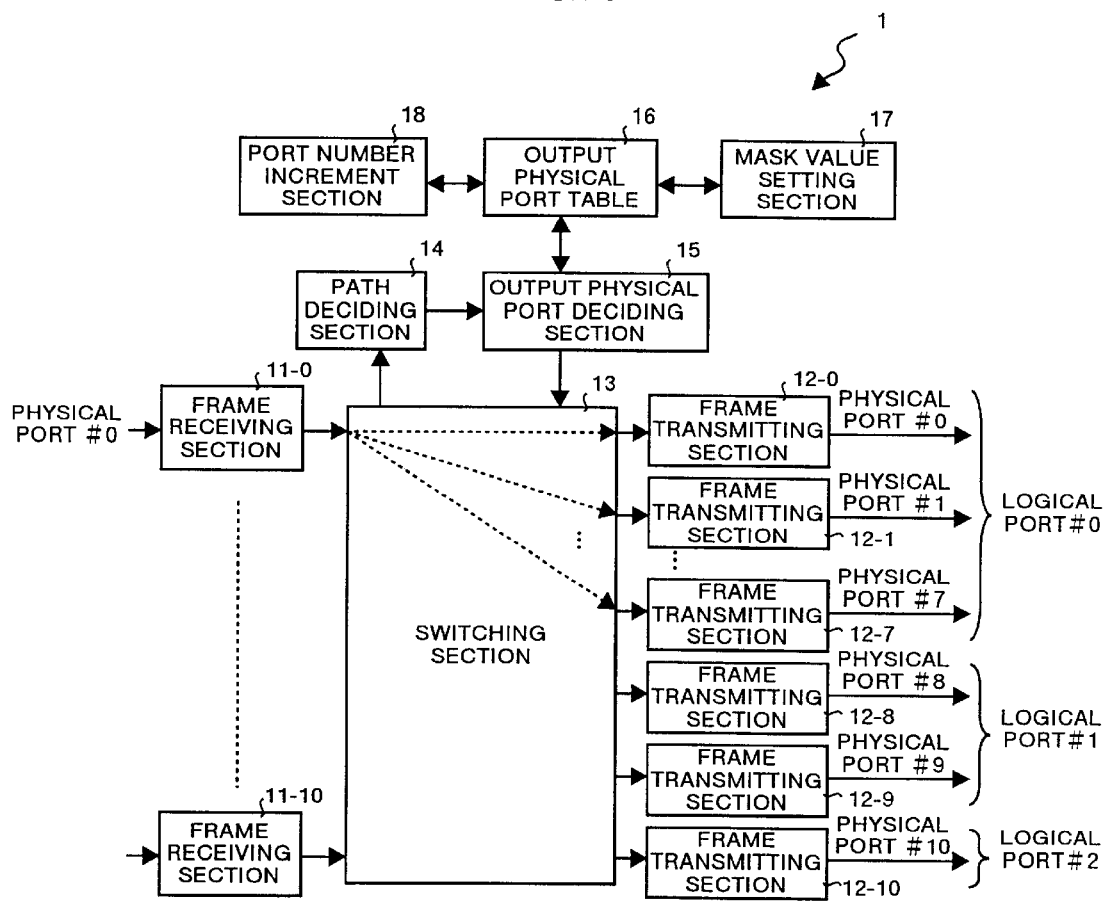
FIG. 1 is a block diagram showing configuration of a transmission equipment according to Embodiment 1 of the present invention.

At first, description is made for configuration of a transmission equipment. FIG. 1 is a block diagram showing configuration of a transmission equipment according to Embodiment 1 of the present invention. The transmission equipment 1 shown in FIG. 1 comprises frame receiving sections 11-0 to 11-10, frame transmitting sections 12-0 to 12-10, a switching section 13, a path deciding section 14, an output physical port deciding section 15, an output physical port table 16, a mask value setting section 17, and a port number increment section 18.

Each of the frame receiving sections 11-0 to 11-10 receives a frame from a network connected thereto, and processes the received frame to a frame format in which the frame can be handled in the equipment. Each of those frame receiving sections 11-0 to 11-10 sends out a received frame to the switching section 13 respectively. Each of the frame transmitting sections 12-0 to 12-10 processes a transmitting frame to a format in which the transmitting frame can be outputted to a network connected thereto and sends out the formatted frame.

There is shown an example herein that 11 units of input physical ports as well as of output physical ports each with reference numerals #0 to #10 are provided so as to enable comparison of the present invention to the example based on the conventional technology. Each of the frame transmitting sections 12-0 to 12-7 corresponds to each of the output physical port #0 to #7 respectively, and defines a bundle of the ports (grouping) as a logical port #O. Each of the frame transmitting sections 12-8 and 12-9 corresponds to each of the output physical port #8 and #9 respectively, and defines a bundle of the ports (grouping) as a logical port #1. The frame transmitting section 12-10 corresponds to the output physical port #10, and defines as a logical port #2.

The switching section 13 executes processing for switching to transfer a received frame from the frame receiving section having received the frame to the frame transmitting section corresponding to the output physical port number decided by the output physical port deciding section 15. The path deciding section 14 receives a received frame from the switching section 13, decides a path from the destination according to the received frame, and decides an output logical port corresponding to the path.

The output physical port deciding section 15 decides an output physical port corresponding to an output logical port by looking up the output physical port table 16. The output physical port table 16 shows a correlation among numbers of output logical ports (output logical port numbers), numbers of output physical ports each to output a transmitting frame (output physical port numbers), and mask values each for specifying a digit position of a bit to be changed, namely incremented of values indicating physical port numbers (4-bit binary information).

The mask value setting section 17 previously decides a grouping of output physical ports (transfer paths) for executing load distribution according to definition concerning the equipment configuration as well as arrangements for the operation, and sets a mask value according to the grouping in the output physical port table 16. The port number increment section 18 increments a value, of values in output physical port numbers, only in a portion (bit) to be incremented specified by the mask value.

Figure 2:
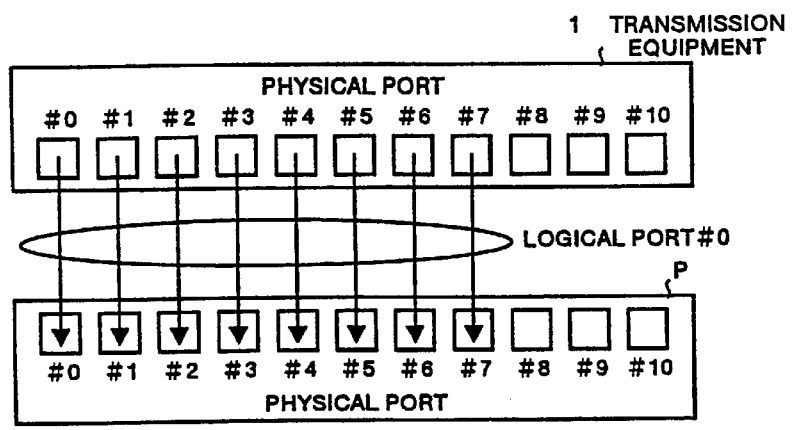
FIG. 2 is a simulated view for explaining a load-distribution transmitting method according to Embodiment 1.
Figure 3:
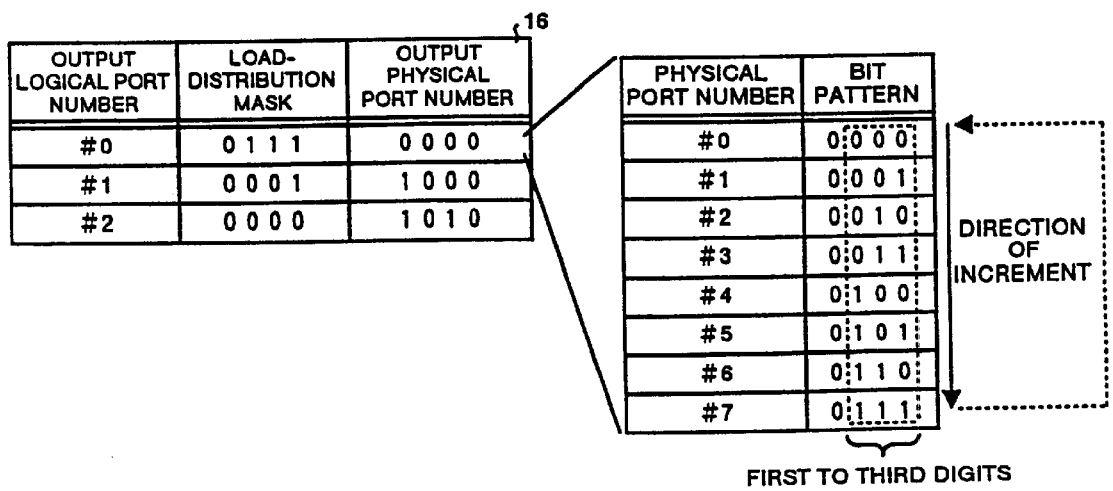
FIG. 3 is a view for explaining a method of changing an output physical port in the condition shown in FIG. 2.
Figure 4:
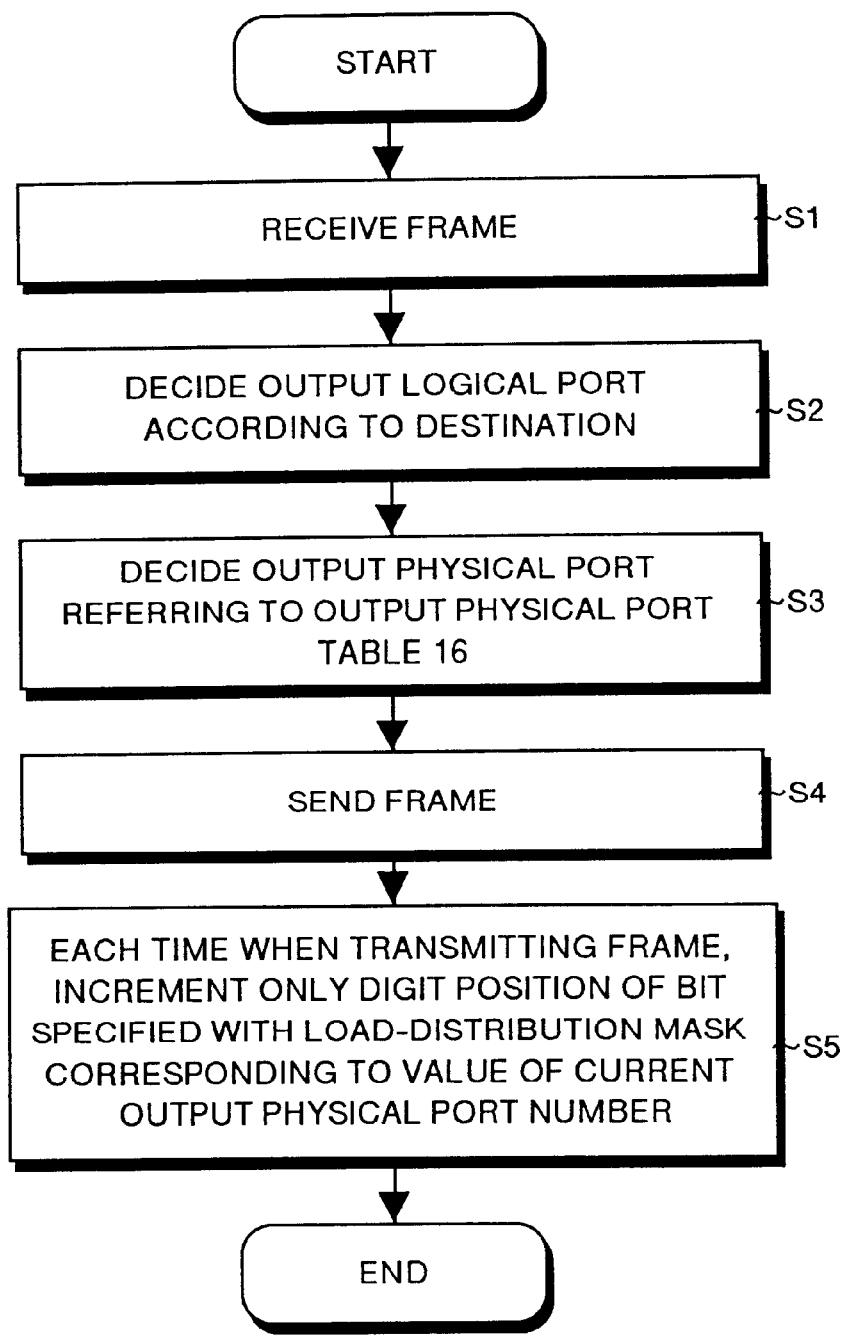
FIG. 4 is a flow chart for explaining a sequence of load-distribution transmission according to Embodiment 1.

Next description is made for the operations. FIG. 2 is a simulated view for explaining a load-distribution transmitting method according to Embodiment 1, FIG. 3 is a view for explaining a method of changing an output physical port in the condition shown in FIG. 2, and FIG. 4 is a flow chart for explaining a sequence of load-distribution transmission according to Embodiment 1.

FIG. 2 shows a grouping in the logical port #0, between the transmission equipment 1 and the transmission equipment P as a partner connected thereto via a network, assuming that physical ports in both of the equipments are connected to each other with the same physical port numbers respectively. Description is made hereinafter for a case as an example where a frame is transmitted to the logical port #0 with reference to FIG. 3 and FIG. 4.

When a frame is received from a network by the transmission equipment 1 (Frame receiving section 11-0 Physical port #0) (step S1), the received frame is sent from the frame receiving section 11-0 to the path deciding section 14 via the switching section 13. It is assumed herein that the frame received from the network is transmitted by the transmission equipment 1 to be transferred to the transmission equipment P as a partner. When the received frame is sent out to the path deciding section 14, the path deciding section 14 decides a destination of the received frame according to the destination information stored therein, and decides a logical port number to which the information for the received frame is to be outputted according to the destination (step S2). The output logical port number decided by this path deciding section 14 is sent out to the output physical port deciding section 15.

The output physical port deciding section 15 looks up the output physical port table 16 using the output logical port number received from the path deciding section 14, and executes processing for obtaining an output physical port number to be decided as a response from the output physical port table 16. At this point of time, the output physical port table 16 selects, according to the output logical port number received from the output physical port deciding section 15, an initial value (4-bit binary information) of an output physical port number corresponding to the received number and sends back the output physical port number to the output physical port deciding section 15 as a response. The output physical port number is decided as described above in the output physical port deciding section 15 (step S3).

The switching section 13 outputs a transmitting frame to a frame transmitting section corresponding to the output physical port number decided by the output physical port deciding section 15. Namely, the transmitting frame is outputted to the output physical port and sent to the network (partner transmission equipment P) (step S4).

FIG. 3 shows table contents of the output physical port table 16. Correlated to the output logical port numbers #0, #1 and #2 in this output physical port table 16 are mask values "0111" (binary), "0001" (binary) and "0000" (binary) of the load-distribution mask, as well as output physical port numbers "0000" (binary), "1000" (binary) and "1010" (binary) respectively.

Accordingly, as the mask value "0111" (binary) is used for frame transmission in the output logical port #0, a range of grouping (output port as an object) includes eight ports of the output physical ports #0 to #7. The mask value indicates which digit position (s) in a bit pattern is to be variable for load distribution to the value of the output physical port number expressed in the same number of bits as that of the mask value. Accordingly, in a case of the output logical port #0, as the mask value in the load-distribution mask is "0111" (binary), the last three digits (first to third digits) of the initial value "0000" (binary) for the output physical port corresponding to the output logical port #0 is a variable portion.

As for the variable portion, the physical port number is incremented by one by the port number increment section 18 each time when a transmitting frame is transmitted for the next transmitting frame. It should be noted that this operation of increment is repeatedly executed each time when a frame is transmitted to the same path (the same output logical port) (step S5).

To further detail, the output physical port number is #0 at a step when a first transmitting frame is transmitted, and the value thereof is "0000" (binary). In order to execute an incrementing operation to this value "0000" (binary) only in the first to third digits defined by the mask value, the value "0000" (binary) of the output physical port #0 is incremented by one to be a value "0001" (binary). This value "0001" (binary) indicates the output physical port #1, and the output physical port number is changed from #0 to #1 by the increment.

FIG. 3 also shows, concerning the output logical port #0, a correlation between values (bit patterns) which are changed in association with successive increment of each value from the initial value "0000" (binary) and physical port numbers. It is clear herein that the output physical port number is regularly changed within the grouping by incrementing operations. Namely, the output physical port numbers are switched one by one in ascending order from #0 to #7 each time when a frame is transmitted. Then, when the output physical port number has arrived at #7, the incrementing operation is started again from the initial number #0. That is because the mask value of the load-distribution mask defines the last three digits as a range in which the grouping is variable.

As described above, load-distribution transmission for a received frame can be realized by using the physical ports #0 to #7 in the frame transferring to the logical port #0. Also, in a case of the logical port #1, as the mask value of the load-distribution mask is "0001" (binary), the last one digit of the initial value "1000" (binary) for the output physical port is an object to be incremented. Accordingly, the same load-distribution transmission as that in the case of the logical port #0 can be realized by using the physical ports #8 and #9 (value "1000" (binary), value "1001" (binary)). Also, in a case of the logical port #2, as the mask value of the load-distribution mask is "0000" (binary), the initial value "1010" (binary) for the output physical port is a fixed value because the value does not require to be incremented. Accordingly, transmission through one output physical port which indicates no load distribution therein can be realized by using the output physical port #10 (value "1010" (binary)) (Refer to FIG. 3).

As described above, with Embodiment 1, when received frames are to successively be transmitted, change of an output physical port is regularly executed within a plurality of output physical ports corresponding to the output logical port acquired from the destination information. For this feature, it is possible to omit operations to look up a table each time when an output physical port with which a load is distributed is changed, and in this case speed-up of load-distribution transmission can be realized. In addition, it is not required to insure resources constituting tables for the look-up, and for this reason, it is possible to realize a compact circuit for load-distribution transmission.

An output physical port number is changed within a range for grouping defined by the mask information, so that load-distribution transmission in an adequate band insured by the grouping can be realized.

Output physical port numbers are changed in ascending order within a range for grouping of paths, so that it is possible to acquire an output physical port number with regularity in changes within the range for grouping as well as a simple operational sequence. It should be noted that as far as an output physical port number is concerned, the same effects can be obtained even if the numbers are decremented in place of being incremented. In this case, a port number decrement section may be provided in place of the port number increment section 18, and output physical port numbers are switched in descending order.

An output physical port number and a mask value each having the same number of bits are correlated to each other with the units of bit, and a digit position to be variable is specified with mask value to a bit pattern of an output physical port number corresponding to the mask value. With this feature, only an output physical port obtained by change of the digit position to be variable is used, and for this reason it is possible to realize load-distribution transmission using any output physical port which is surely desired.

Although the relation between an output physical port and a load-distribution mask (mask value) is fixedly set in Embodiment 1, like Embodiment 2 described below, grouping may be variable by setting a plurality of load-distribution masks to one unit of output physical port. It should be noted that this Embodiment 2 has the same configuration as that of Embodiment 1, so that description thereof is omitted herein, and description is made hereinafter only for operations different from those in Embodiment 1.

Figure 5:
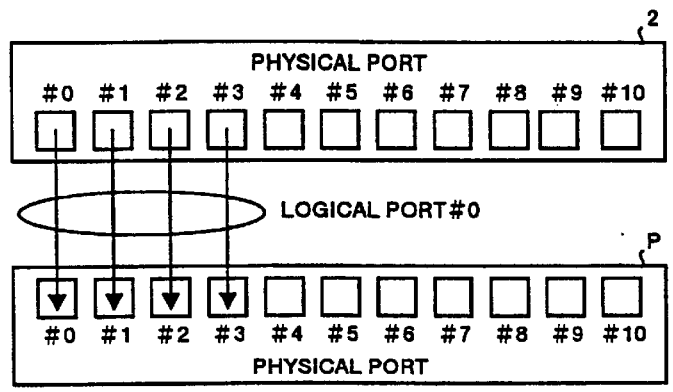
FIG. 5 is a simulated view for explaining a load-distribution transmitting method with an initial mask value according to Embodiment 2 of the present invention.
Figure 7:
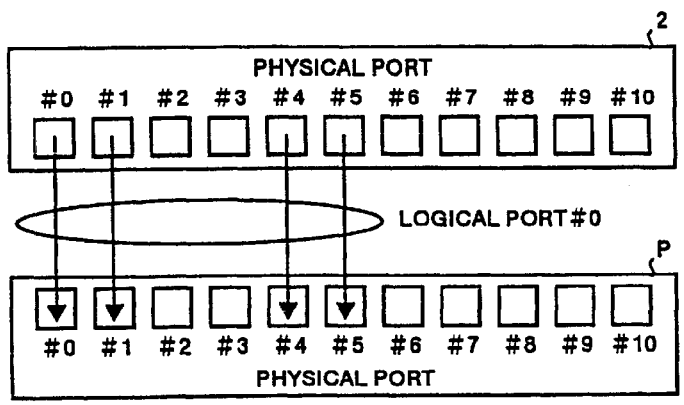
FIG. 7 is a simulated view for explaining a load-distribution transmitting method with a changed mask value (part 1) according to Embodiment 2 of the present invention.
Figure 8:
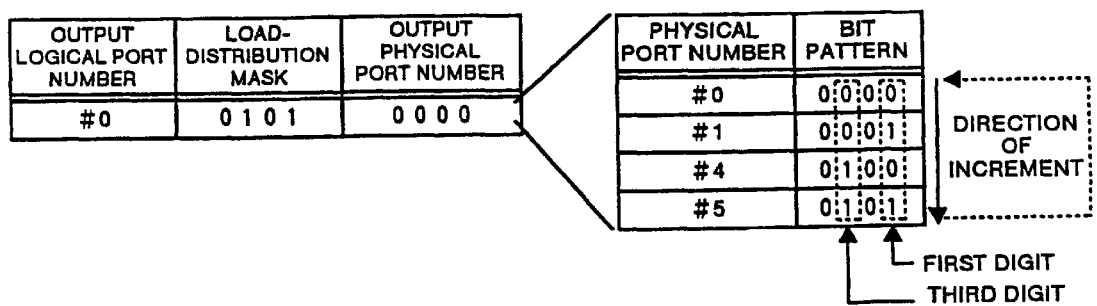
FIG. 8 is a view for explaining a method of changing an output physical port in the condition shown in FIG. 7.
Figure 9:
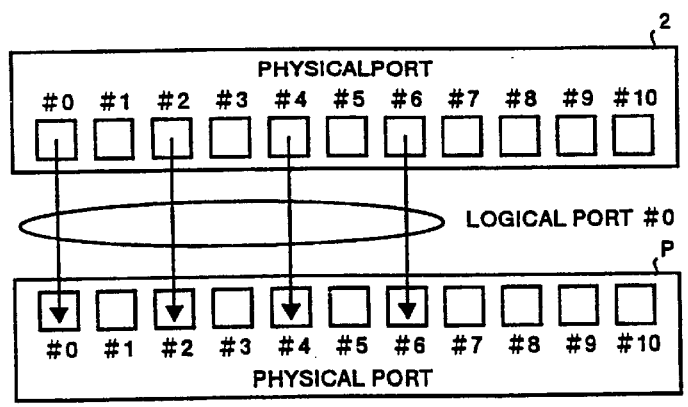
FIG. 9 is a simulated view for explaining a load-distribution transmitting method with a changed mask value (part 2) according to Embodiment 2 of the present invention.
Figure 10:
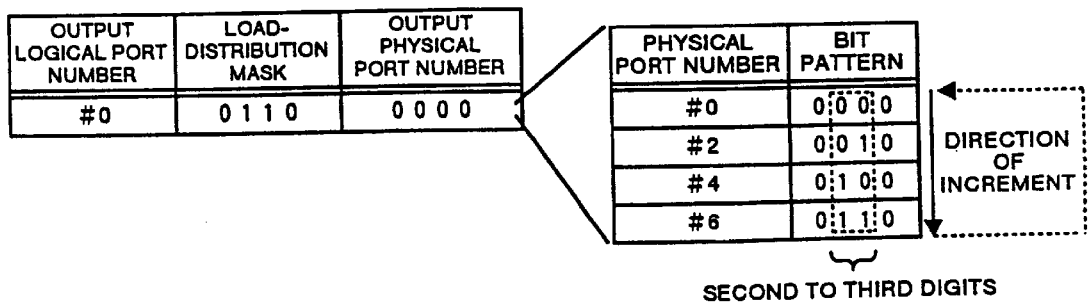
FIG. 10 is a view for explaining a method of changing an output physical port in the condition shown in FIG. 9.

Description is made herein for the operations in Embodiment 2. FIG. 5 is a simulated view for explaining a load-distribution transmitting method with an initial mask value according to Embodiment 2 of the present invention, FIG. 6 is a view for explaining a method of changing an output physical port in the condition shown in FIG. 5, FIG. 7 is a simulated view for explaining a load-distribution transmitting method with a changed mask value (part 1), FIG. 8 is a view for explaining a method of changing an output physical port in the condition shown in FIG. 7, FIG. 9 is a simulated view for explaining a load-distribution transmitting method with a changed mask value (part 2), and FIG. 10 is a view for explaining a method of changing an output physical port in the condition shown in FIG. 9.

The mask value according to Embodiment 1 comprises a bit pattern with variable bits successive from the least significant bit (first digit) to a higher order bit, but, in Embodiment 2, valid bits of the mask value are made discontinuous, or the least significant bit is not necessarily included in the mask value.

Figure 6:
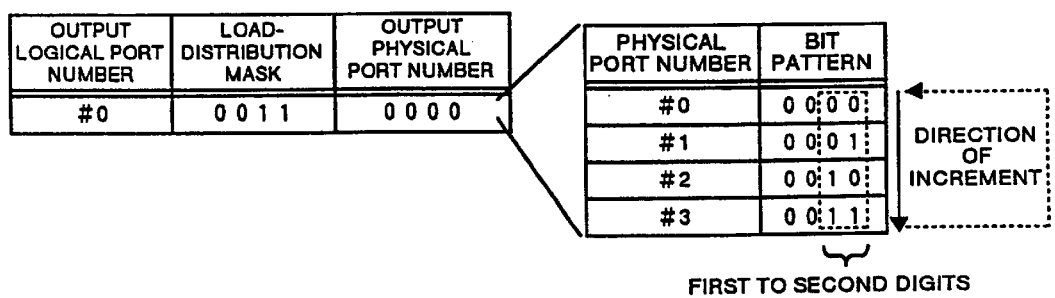
FIG. 6 is a view for explaining a method of changing an output physical port in the condition shown in FIG. 5.

At first, concerning a mask value, description is made for a bit pattern in which valid bits are continuous and which includes the least significant bit with reference to FIG. 5 and FIG. 6. FIG. 5 shows a grouping in a logical port #0, between a transmission equipment 2 and a transmission equipment P as a partner connected thereto via a network each according to Embodiment 2, assuming that physical ports in both of the equipments are connected to each other with the same physical port numbers respectively. In this case, four ports of output physical ports #0 to #3 are included in a range (object) of grouping. This range of grouping is defined with the mask value in an output physical port table shown in FIG. 6.

FIG. 6 shows a portion of the output physical port table according to Embodiment 2. In FIG. 6, a mask value "0011" (binary) of a load-distribution mask and an initial value "0000" (binary) of an output physical port are correlated to the output logical port #0 and stored in the table. The initial value "0000" (binary) of this output physical port expresses the output physical port #0 with binary information. The mask value "0011" (binary) of the load-distribution mask indicates a range in which the last two digits (first and second bits) are variable. For this reason, in the range for grouping transfer paths shown in FIG. 5, switching of ports is executed together with each frame transmission in association with each operation of incrementing a port number within the output physical ports #0 to #3.

In Embodiment 2, a change for the mask value can be specified. The change is specified by the mask value setting section 17 shown in FIG. 1. The change of the mask value through this mask value setting section 17 is realized by information received from other communication equipment connected to the network or by changing the setting in an operator control panel for the equipment which is not shown.

Then, concerning the mask value, description is made for a bit pattern including a portion in which valid bits are not continuous with reference to FIG. 7 and FIG. 8. FIG. 7 shows, concerning the logical port #0, a grouping including a portion in which some of output physical ports each as an object for grouping is separated from the others, which is different from the connected relation between the transmission equipment 2 and the transmission equipment P as a partner shown in FIG. 5. In this case, four ports of output physical ports #0, #1, #4 and #5 are included in a range (object) of grouping. This range of grouping is defined with the mask value in an output physical port table shown in FIG. 8.

FIG. 8 shows a portion of the output physical port table when only the mask value is changed in the correlation between the output logical port number and the load-distribution mask shown in FIG. 6. In FIG. 8, a mask value "0101" (binary) of a load-distribution mask and an initial value "0000" (binary) of an output physical port are correlated to the output logical port #0 and stored in the table. The mask value "0101" (binary) of the load-distribution mask indicates a range in which bits in the first and third digits are variable. For this reason, switching of ports is executed together with each frame transmission in association with each operation of incrementing a port number within the output physical ports #0, #1, #4 and #5 in the range of grouping the transfer paths shown in FIG. 7.

To further detail here about the operations of increment shown in FIG. 8, in a case of the mask value "0101" (binary), two bits comprising the first and third digits may be incremented one by one from "00" (binary). Namely, changes according to the increment are "00" (binary)-"01" (binary) -"10" (binary)-"11" (binary). Simply considering only those two bits, values obtained by the increment are changed like 0-1-2-3, but if the other two fixed bits are included in each of the values, the values obtained by the increment are changed like 0-1-4-5. Accordingly, the output physical port numbers obtained by the increment are #0-#1-#4-#5.

Then, concerning the mask value, description is made for a bit pattern in which valid bits do not include the least significant bit with reference to FIG. 9 and FIG. 10. FIG. 9 shows, concerning the logical port #0, a grouping different from the connected relation between the transmission equipment 2 and the transmission equipment P as a partner shown in FIG. 5 and FIG. 7. In this case, four ports of output physical ports #0, #2, #4 and #6 are included in a range (object) of grouping. This range of grouping is defined with the mask value in an output physical port table shown in FIG. 10.

FIG. 10 shows a portion of the output physical port table when only the mask value is changed in the correlation between the output logical port number and the load-distribution mask shown in FIG. 6. In FIG. 10, a mask value "0110" (binary) of a load-distribution mask and an initial value "0000" (binary) of an output physical port are correlated to the output logical port #0 and stored in the table. The mask value "0110" (binary) of the load-distribution mask indicates a range in which bits in the second and third digits are variable. For this reason, switching of ports is executed together with each frame transmission in association with each operation of incrementing a port number within the output physical ports #0, #2, #4 and #6 in the range of grouping the transfer paths shown in FIG. 9.

To further detail here about the operations of increment shown in FIG. 10, in a case of the mask value "0110" (binary), two bits comprising the second and third digits may be incremented one by one from "00" (binary). Namely, changes according to the increment are "00" (binary)-"01" (binary) -"10" (binary)-"11" (binary). Simply considering only those two bits, values obtained by the increment are changed like 0-1-2-3, but if the other two fixed bits are included in each of the values, the values obtained by the increment are changed like 0-2-4-6. Accordingly, the output physical port numbers obtained by the increment are #0-#2-#4-#6.

As described above, with Embodiment 2, flexibility can be obtained in grouping by changing a mask value, and even if variations are given to the grouping as described above, it is possible to omit operations to look up a table each time when an output physical port with which a load is distributed is changed, and in this case, speed-up of load-distribution transmission can be realized. In addition, it is not required to insure resources constituting tables for the look-up, and for this reason, it is possible to realize a compact circuit for load-distribution transmission.

It should be noted that description of the effects in common with Embodiment 1 is omitted herein.

The present invention is applicable, like Embodiment 3 described below, to an interface board type of transmission equipment. It should be noted that the internal configuration thereof is the same as that in Embodiment 1 or 2, so that description thereof is omitted herein, but only operations different from those in Embodiment 1 or 2 are hereinafter explained.

Figure 11:
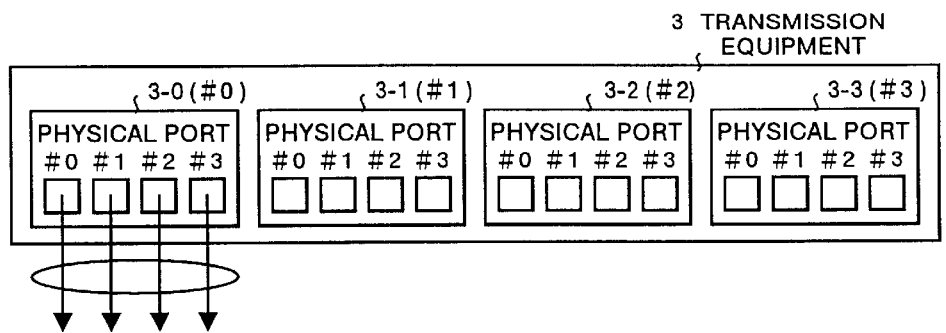
FIG. 11 is a simulated view for explaining a load-distribution transmitting method in an interface board type of transmission equipment according to Embodiment 3 of the present invention.
Figure 13:
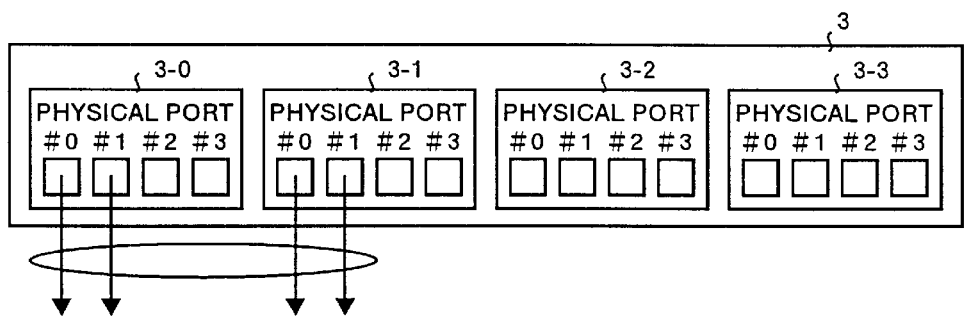
FIG. 13 is a simulated view for explaining a load-distribution transmitting method with a changed mask value (part 1) according to Embodiment 3 of the present invention.
Figure 14:
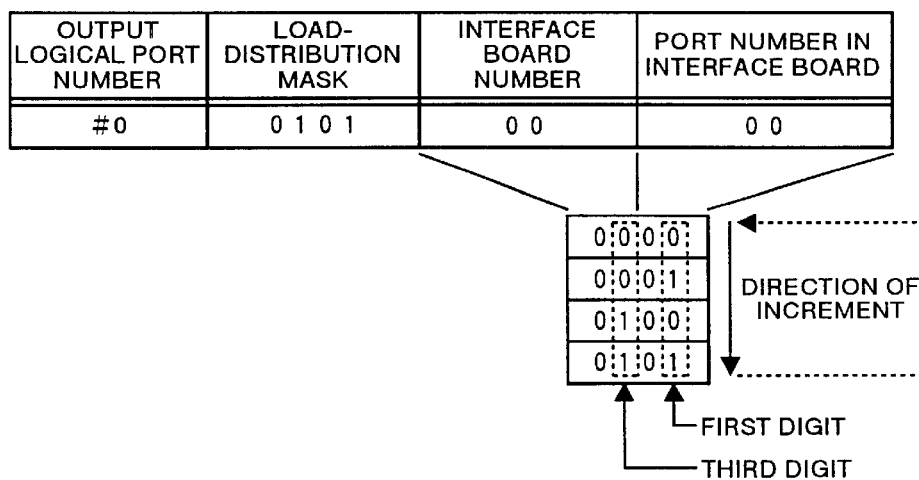
FIG. 14 is a view for explaining a method of changing an output physical port in the condition shown in FIG. 13.
Figure 15:
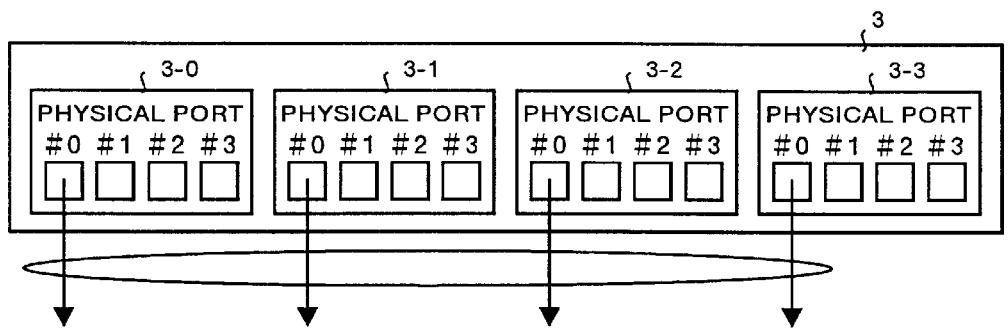
FIG. 15 is a simulated view for explaining a load-distribution transmitting method with a changed mask value (part 2) according to Embodiment 3 of the present invention.
Figure 16:
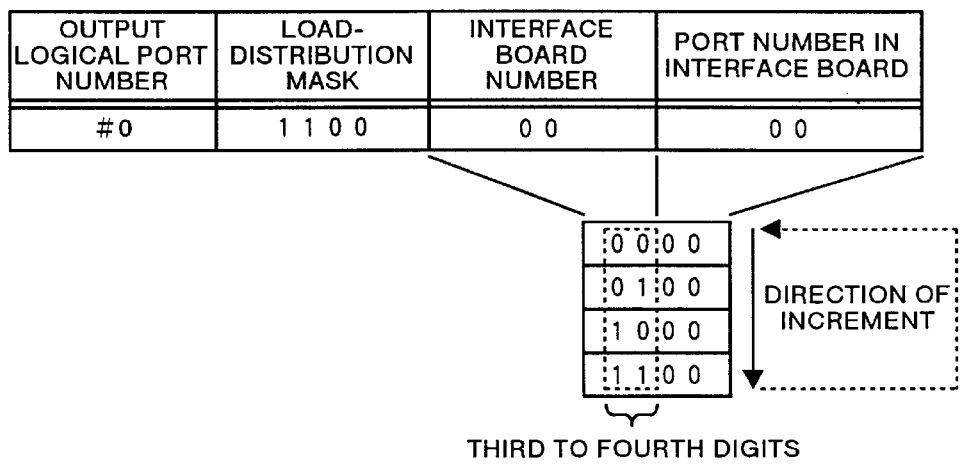
FIG. 16 is a view for explaining a method of changing an output physical port in the condition shown in FIG. 15.

Description is made herein for operations in Embodiment 3. FIG. 11 is a simulated view for explaining a load-distribution transmitting method in an interface board type of transmission equipment according to Embodiment 3 of the present invention, FIG. 12 is a view for explaining a method of changing an output physical port in the condition shown in FIG. 11, FIG. 13 is a simulated view for explaining a load-distribution transmitting method with a changed mask value (part 1), FIG. 14 is a view for explaining a method of changing an output physical port in the condition shown in FIG. 13, FIG. 15 is a simulated view for explaining a load-distribution transmitting method with a changed mask value (part 2), and FIG. 16 is a view for explaining a method of changing an output physical port in the condition shown in FIG. 15.

There is some transmission equipment on which one or a plurality units of interface board each obtained by integrating some of physical port each as an interface section with a network are packaged. FIG. 11 shows one of the examples. Interface boards 3-0 (#0) to 3-3 (#3) are provided in a transmission equipment 3 according to Embodiment 3 in FIG. 11. Four output physical ports (#0 to #3) are provided in common in each of the interface boards 3-0 to 3-3. FIG. 11 shows an example of which the four output physical ports (#0 to #3) of the interface board 3-0 are set as a range of grouping. This range of grouping is defined with the mask value in an output physical port table shown in FIG. 12.

In a case of Embodiment 3 here, there is used an output physical port number comprising an interface board number (expressed with 2-bit binary information) as a higher order and a port number in each of interface boards (expressed with 2-bit binary information) as a lower order respectively. As far as configuration of the output physical port table is concerned, an interface board number and a port number in each of interface boards are provided therein as an output physical port number, and the others are the same as that in Embodiment 1 or 2.

Figure 12:
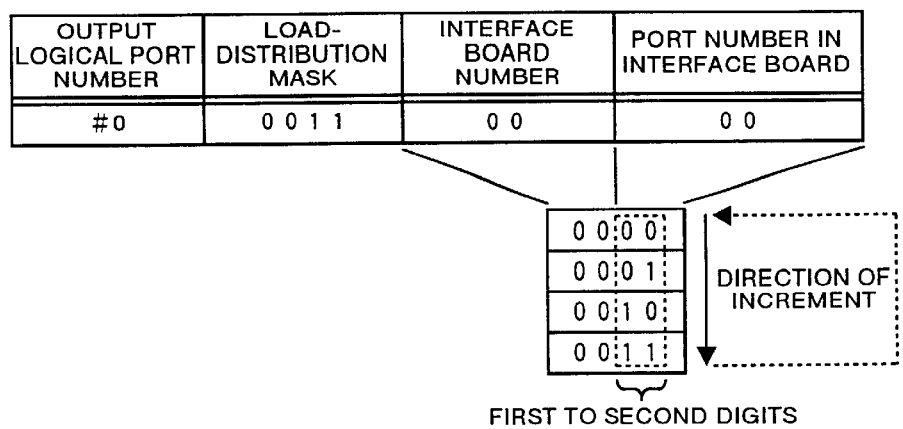
FIG. 12 is a view for explaining a method of changing an output physical port in the condition shown in FIG. 11.

FIG. 12 shows a portion of the output physical port table according to Embodiment 3. In FIG. 12, a mask value "0011" (binary) of a load-distribution mask and an initial value "0000" (binary) of an output physical port are correlated to the output logical port #0 and stored in the table. The initial value "0000" (binary) of this output physical port is formed with an initial value "00" (binary) of an interface board number as well as with an initial value "00" (binary) of a port number in each of interface boards, and expresses the output physical port #0 with binary information.

The mask value "0011" (binary) of the load-distribution mask indicates a range in which the last two digits (bits in the first and second digits) in the value of an output physical port number are variable. Namely, a portion corresponding to the last two digits is a port number in an interface board. For this reason, the range for grouping transfer paths shown in FIG. 11 indicates the interface board 3-0 of the interface board #0. In this interface board 3-0, switching of ports is executed together with each frame transmission in association with operations of incrementing a port number within the output physical ports #0 to #3.

To further detail here about the operations of increment shown in FIG. 12, in a case of the mask value "0011" (binary), two bits comprising the first and second digits may be incremented one by one from "00" (binary). Namely, changes according to the increment are "00" (binary)-"01" (binary) -"10" (binary)-"11" (binary). Simply considering only those two bits (port number in an interface board), values obtained by the increment are changed like 0-1-2-3. Further, if the other two fixed bits (interface board number) are included in each of the values, the values obtained by the increment are not changed like 0-0-0-0 as far as an interface board number is concerned, but are changed like 0-1-2-3 as far as a port number in the interface board is concerned. Accordingly, the output physical port numbers obtained by the increment are #0-#1-#2-#3 in the interface board 3-0.

In Embodiment 3, a change for the mask value can be specified. The change is specified by the mask value setting section 17 shown in FIG. 1. In Embodiment 3, the change of the mask value through this mask value setting section 17 is also realized by information received from other communication equipment connected to the network or by changing the setting of an operator control panel for the equipment which is not shown.

Then, concerning the mask value, description is made for a bit pattern including a portion in which valid bits are not continuous with reference to FIG. 13 and FIG. 14. FIG. 13 shows, concerning the logical port #0, a grouping including a portion in which some of output physical ports each as an object for grouping is separated from the others, which is different from the connected relation between the transmission equipment 3 and the transmission equipment P as a partner shown in FIG. 11. Concretely, as four ports comprising the output physical ports #0 and #1 of the interface board 3-0 and those #0 and #1 of the interface boar 3-1 are included in a range (object) of grouping, the range spans the two units of interface board. This range of grouping is defined with the mask value in an output physical port table shown in FIG. 14.

FIG. 14 shows a portion of the output physical port table when only the mask value is changed in the correlation between the output logical port number and the load-distribution mask shown in FIG. 12. In FIG. 14, a mask value "0101" (binary) of a load-distribution mask and an initial value "0000" (binary) of an output physical port are correlated to the output logical port #0 and stored in the table. The mask value "0101" (binary) of the load-distribution mask indicates a range in which bits in the first and third digits are variable. For this reason, in the range for grouping transfer paths shown in FIG. 13, switching of ports is executed together with each frame transmission in association with each operation of incrementing a port number within the output physical ports #0, #1 of the interface board 3-0 and those #0 and #1 of the interface board 3-1.

To further detail here about the operations of increment shown in FIG. 14, in a case of the mask value "0101" (binary), two bits comprising the first and third digits in the value of the output physical port number may be incremented one by one from "00" (binary). Namely, changes according to the increment are "00" (binary)-"01" (binary)-"10" (binary)-"11" (binary). Simply considering only those two bits, the values obtained by the increment are changed like 0-1-2-3, but if the other two fixed bits are included in each of the values, the values obtained by the increment are changed like 0-0-1-1 as far as the interface board number is concerned, but are changed like 0-1-0-1 as far as the port number in the interface board is concerned. Accordingly, the output physical port numbers obtained by the increment change like #0-#1 in the interface board 3-0, and then change like #0-#1 in the interface board 3-1. The operation of switching ports according to this frame transmission is repeatedly executed.

Then, concerning the mask value, description is made for a bit pattern in which valid bits do not include the least significant bit with reference to FIG. 15 and FIG. 16. FIG. 15 shows, concerning the logical port #0, a grouping different from the connected relation between the transmission equipment 3 and the transmission equipment P as a partner shown in FIG. 11 and FIG. 13. Concretely, as four ports comprising each of the output physical ports #0 of the interface boards 3-0 to 3-3 are included in a range (object) of grouping, the range spans four units of interface board. This range of grouping is defined with the mask value in an output physical port table shown in FIG. 16.

FIG. 16 shows a portion of the output physical port table when only the mask value is changed in the correlation between the output logical port number and the load-distribution mask shown in FIG. 12. In FIG. 16, a mask value "1100" (binary) of a load-distribution mask and an initial value "0000" (binary) of an output physical port are correlated to the output logical port #0 and stored in the table. The mask value "1100" (binary) of the load-distribution mask indicates a range in which bits in the third and fourth digits (interface board number) are variable. For this reason, in the range for grouping transfer paths shown in FIG. 15, switching of ports is executed together with each frame transmission in association with each operation of incrementing a port number within all the output physical port numbers of the interface boards 3-0 to 3-3.

To further detail here about the operations of increment shown in FIG. 16, in a case of the mask value "1100" (binary), two bits comprising the third and fourth digits may be incremented one by one from "00" (binary). Namely, changes according to the increment are "00" (binary)-"01" (binary) -"10" (binary)-"11" (binary). Simply considering only those two bits (interface board number), the values obtained by the increment are changed like 0-1-2-3. If the other two fixed bits (port number in an interface board) are further included in each of the values, the values obtained by the increment are changed like 0-1-2-3 as far as the interface board number is concerned, but are not changed like 0-0-0-0 as far as the port number in the interface board is concerned. Accordingly, the output physical port numbers obtained by the increment are #0-#0-#0-#0 by spanning the interface boards 3-0 to 3-3.

As described above, with Embodiment 3, a plurality of output physical port numbers (numbers each obtained by combining a board number for an interface board and a port number in the interface boards corresponding to the board number) corresponding to the output logical port number acquired from destination information and mask information for varying any output physical port number of the plurality of output physical port numbers for load distribution are acquired by looking up an output physical port table, and when received frames are to successively be transmitted, change of an output physical port number can be executed according to the mask information within a plurality of output physical port numbers corresponding to the output logical port acquired from the destination information.

With those operations, even when a plurality of ports are provided in each of a plurality of interface boards respectively, it is possible to omit operations to look up a table each time when an output physical port with which a load is distributed is changed by changing a bit pattern with valid bits of the mask value, and in this case, speed-up of load-distribution transmission can be realized. With this feature, it is possible to give flexibility to a grouping of physical ports provided across interface boards. In addition, it is not required to insure resources constituting tables for the look-up, and for this reason, it is possible to realize a compact circuit for load-distribution transmission. It should be noted that description of the effects in common with Embodiments 1 and 2 is omitted herein.

The present invention may realize, like in Embodiment 4 described below, frame transmission in an adequate band at any time by increasing or decreasing the number of digits of a mask value according to changes in contents of definition concerning configuration of a transmission equipment (definition on equipment configuration). It should be noted that the whole operations of load-distribution transmission follow those in Embodiment 1 (Refer to FIG. 4).

Figure 17:
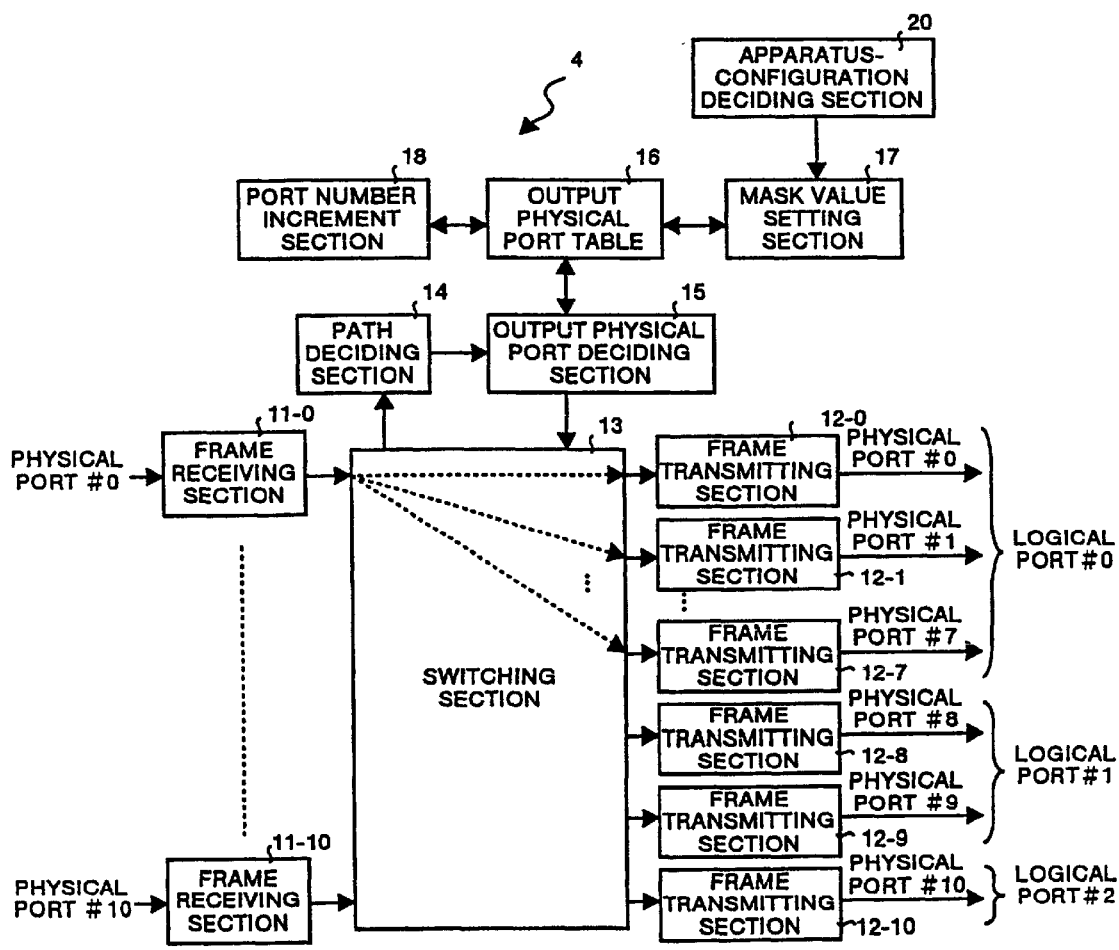
FIG. 17 is a block diagram showing configuration of a transmission equipment according to Embodiment 4 of the present invention.

At first, description is made for configuration of a transmission equipment. FIG. 17 is a block diagram showing configuration of a transmission equipment according to Embodiment 4 of the present invention. Description is made herein only for the configuration different from that of the transmission equipment 1 which has been explained in Embodiment 1. The transmission equipment 4 according to Embodiment 4 shown in FIG. 17 has configuration in which an equipment-configuration defining section 20 is extensively connected to a mask value setting section 17.

The equipment-configuration defining section 20 instructs definition on configuration of the equipment as well as change of a mask value to the mask value setting section 17 according to the change of the definition. The change of a mask value can change a range of grouping and control for enlargement or reduction of a band for transfer paths. This equipment-configuration defining section 20 gives an instruction to enlarge or reduce the band for transfer paths between transmission equipments according to information received from other communication equipment to the network or from an operator control panel, which is not shown, by an operator of the equipment.

Figure 18:
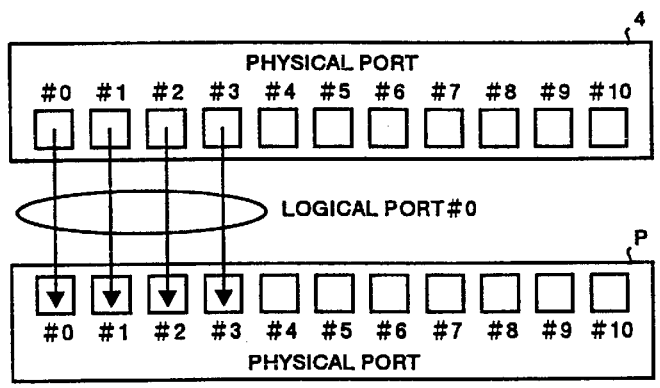
FIG. 18 is a simulated view for explaining a load-distribution transmitting method with some mask value according to Embodiment 4.
Figure 20:
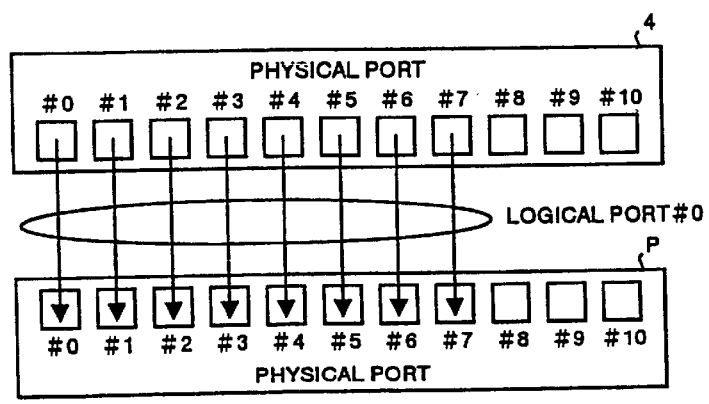
FIG. 20 is a simulated view for explaining a load-distribution transmitting method with a changed mask value (increase of the number of digits) according to Embodiment 4.
Figure 21:
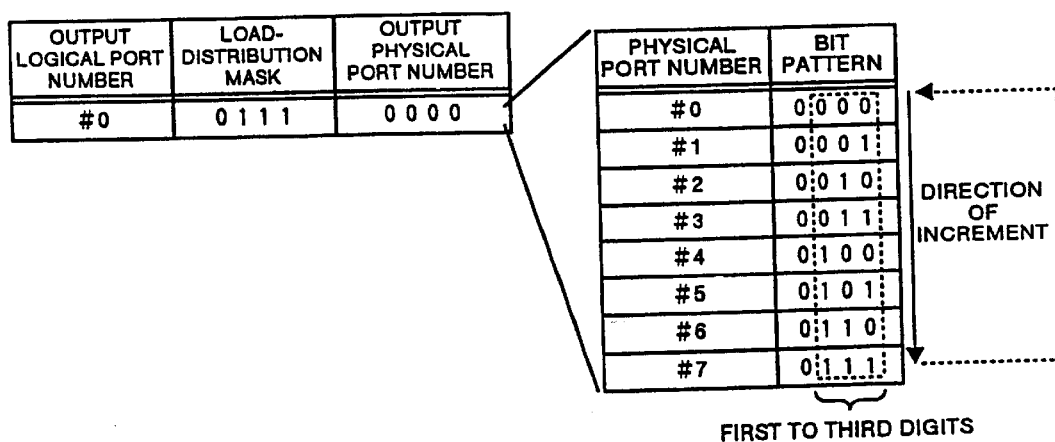
FIG. 21 is a view for explaining a method of changing an output physical port in the condition shown in FIG. 20.
Figure 22:
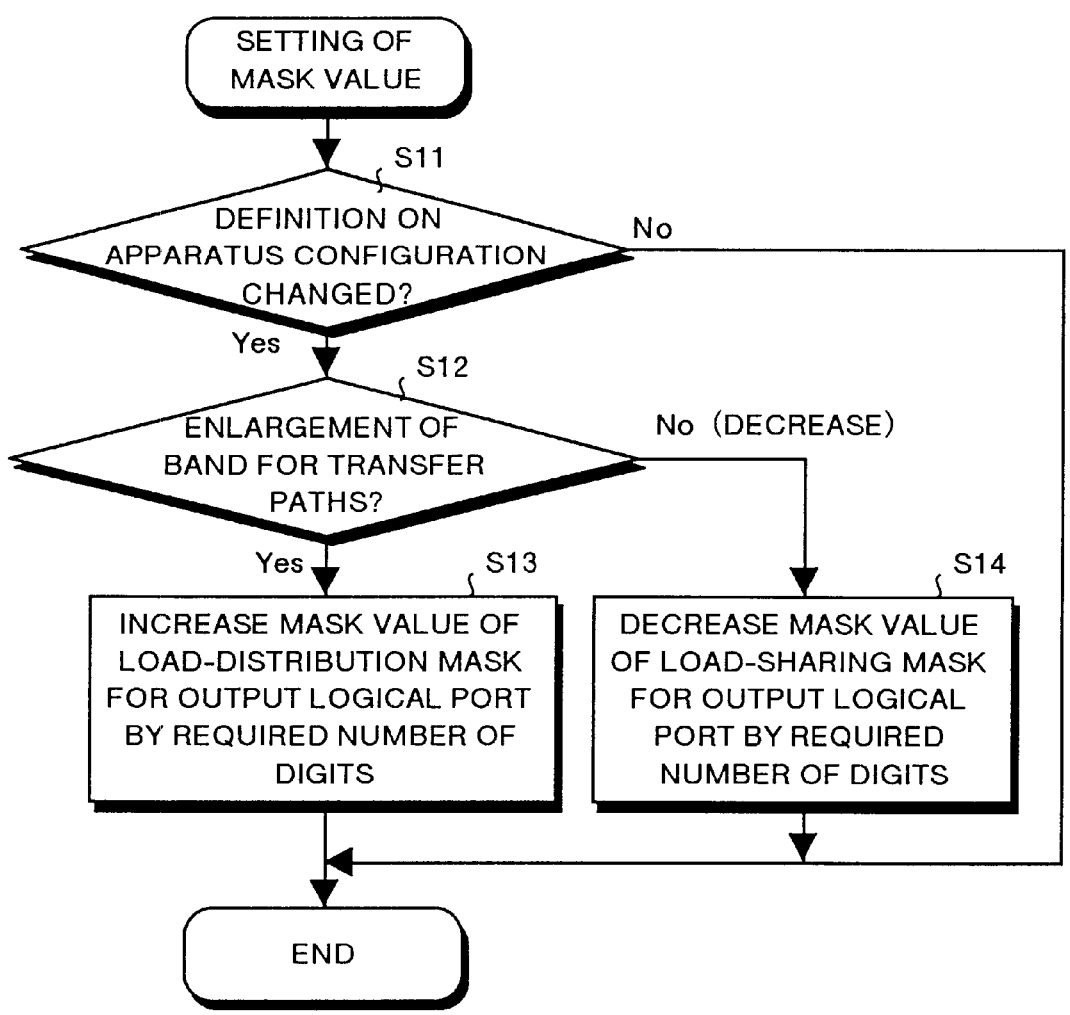
FIG. 22 is a flow chart for explaining a sequence of setting a mask value according to Embodiment 4.

Next description is made for the operations. FIG. 18 is a simulated view for explaining a load-distribution transmitting method with any mask value according to Embodiment 4, FIG. 19 is a view for explaining a method of changing an output physical port in the condition shown in FIG. 18, FIG. 20 is a simulated view for explaining a load-distribution transmitting method with a changed mask value (increase of the number of digits), FIG. 21 is a view for explaining a method of changing an output physical port in the condition shown in FIG. 20, FIG. 22 is a flow chart for explaining a sequence of setting a mask value.

Figure 19:
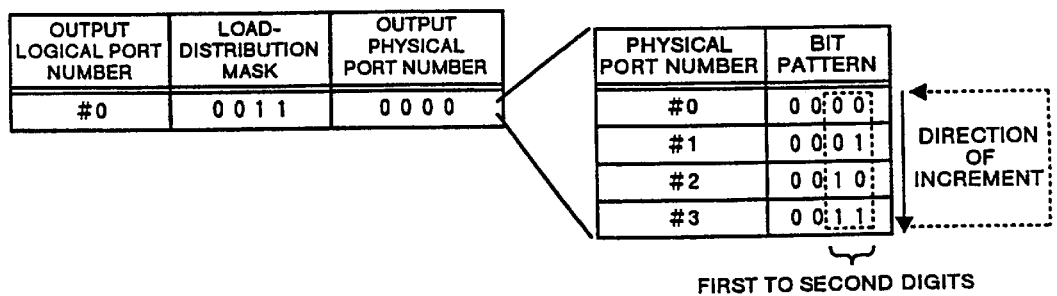
FIG. 19 is a view for explaining a method of changing an output physical port in the condition shown in FIG. 18.

At first, description is made for initial setting of a mask value with reference to FIG. 18 and FIG. 19. FIG. 18 shows a grouping in a logical port #0, between a transmission equipment 4 and a transmission equipment P as a partner connected thereto via a network each according to Embodiment 4, assuming that physical ports in both of the equipments are connected to each other with the same physical port numbers respectively. In this case, four ports of output physical ports #0 to #3 are included in a range (object) of grouping. This range of grouping is defined with the mask value in an output physical port table shown in FIG. 19.

FIG. 19 shows a portion of the output physical port table according to Embodiment 4. In FIG. 19, a mask value "0011" (binary) of a load-distribution mask and an initial value "0000" (binary) of an output physical port are correlated to the output logical port #0 and stored in the table. The mask value "0011" (binary) of the load-distribution mask indicates a range in which the last two digits (bits in the first and second digits) are variable. For this reason, in the range for grouping transfer paths shown in FIG. 18, switching of ports is executed together with each frame transmission in association with each operation of incrementing a port number within the output physical ports #0 to #3.

In Embodiment 4, a change for the mask value can be specified in the mask value setting section 17 according to change in definition concerning equipment configuration in the equipment-configuration defining section 20. The change of a mask value through those equipment-configuration defining section 20 as well as mask value setting section 17 can be realized by changing the setting of definition on equipment configuration by an operator.

Next description is made for the change of a mask value according to the change in definition on equipment configuration with reference to FIG. 20 and FIG. 21. FIG. 20 shows, concerning the logical port #0, a grouping in which the number of output physical ports each as an object for grouping increases, which is different from the connected relation between the transmission equipment 4 and the transmission equipment P as a partner shown in FIG. 18. This increase in the number of output physical ports indicates enlargement of the band for transfer paths. In this case, eight ports comprising the output physical ports #0 and #7 are included in a range (object) of grouping. This range of grouping is defined with the mask value in an output physical port table shown in FIG. 21.

FIG. 21 shows a portion of the output physical port table when only the mask value is changed in the correlation between the output logical port number and the load-distribution mask shown in FIG. 19. In FIG. 21, a mask value "0111" (binary) of a load-distribution mask and an initial value "0000" (binary) of an output physical port are correlated to the output logical port #0 and stored in the table. The mask value "0111" (binary) of the load-distribution mask indicates a range in which all bits in the first to third digits are variable. For this reason, in the range for grouping transfer paths shown in FIG. 20, switching of ports is executed together with each frame transmission in association with each operation of incrementing a port number within the output physical ports #0 to #7.

To further detail here about the operations of increment shown in FIG. 21, in a case of the mask value "0111" (binary), three bits comprising the first to third digits may be incremented one by one from "000" (binary). Namely, changes according to the increment are "000" (binary)-"001" (binary) -"010" (binary)-"011" (binary) . . . "0110" (binary)-"0111" (binary). Simply considering only those three bits, the values obtained by the increment are changed like 0-1-2-3 . . . 6 -7. If the other one fixed bit (fourth digit) is included in each of the values, the values obtained by the increment are changed like 0-1-2-3 . . . 6-7. Accordingly, the output physical port numbers obtained by the increment are #0-#1-#2 -#3 . . . #6-#7.

As described above, in the range of grouping shown in FIG. 20, the band is enlarged so that the number of ports is doubled for the band for transfer paths within the range of grouping shown in FIG. 18. To further detail, the number of usable ports can be increased as twice as many for each time when a mask value is incremented by one bit.

On the other hand, the change of a mask value includes not only increase of the number of bits, but also decrease of the number of bits. Namely, the range of grouping in FIG. 20 can be degraded. For example, bits for a mask value of the load-distribution mask may be deleted from a bit in the higher digit. For example, when the bit in the third digit for the mask value "0111" (binary) in FIG. 21 is deleted, the mask value returns to the original mask value "0011" (binary), and the output physical ports obtained with the original mask value are four ports of ports #0 to #3. The change of the range for grouping in this case is effected by reduction (degradation) of a band for transfer paths.

More specific description is made for the operations for setting a mask value with reference to FIG. 22. The processing for setting a mask value described below is executed with a change (setting is also included) in definition on equipment configuration as one of triggers. When a change (also setting included) in definition on equipment configuration is instructed to the equipment-configuration defining section 20, the equipment-configuration defining section 20 determines that the definition on equipment configuration has to be changed (step S11) and determines whether contents of the change indicates increase of a mask value or decrease thereof (step S12). If it is determined that the mask value is to be increased, the processing shifts to step S13 for enlargement of a band for transfer paths, and the mask value of the load-distribution mask for each output logical port is increased by a required number of digits. With this operation, like the range for grouping shown in FIG. 20, it is possible to realize a load-distribution transmitting method under such conditions that a band for transfer paths is enlarged by increasing the number of output physical ports to be used.

On the other hand, if it is determined that the mask value is to be decreased, the processing shifts to step S14 for reduction of the band for transfer paths, and the mask value of the load-distribution mask for each logical port is decreased by a required number of digits. With this operation, like the range for grouping shown in FIG. 18, it is possible to realize a load-distribution transmitting method under such conditions that a band for transfer paths is reduced (degraded) by decreasing the number of output physical ports to be used.

It should be noted that, concerning the number of digits in a mask value, the number of digits for increase or decrease by a required number o f digits is decided by an operator. Also, if no change is required in the definition on equipment configuration in step S11, this processing is ended.

As described above, with Embodiment 4, mask information corresponding to each of output logical ports is changed and set to mask information for defining a range to insure a band for transfer paths adequate for changed contents of the definition concerning the equipment configuration from the range of grouping according to the mask information, so that flexibility can be given to grouping according to the changed contents of the definition on the equipment configuration. With this operation, the higher efficiency of load-distribution transmission can be achieved.

Also, a range of grouping is enlarged or reduced according to changed conditions of definition concerning the equipment configuration, so that a band to be insured can be enlarged or reduced according to enlargement or reduction of the grouping range. With this operation, the higher efficiency of load-distribution transmission can be achieved.

The present invention may realize, like Embodiment 5 described below, frame transmission under such conditions that a secure band is insured by degrading a mask value according to occurrence of communication trouble related to an output physical port. It should be noted that the whole operations of load-distribution transmission follow those in Embodiment 1 (Refer to FIG. 4).

Figure 23:
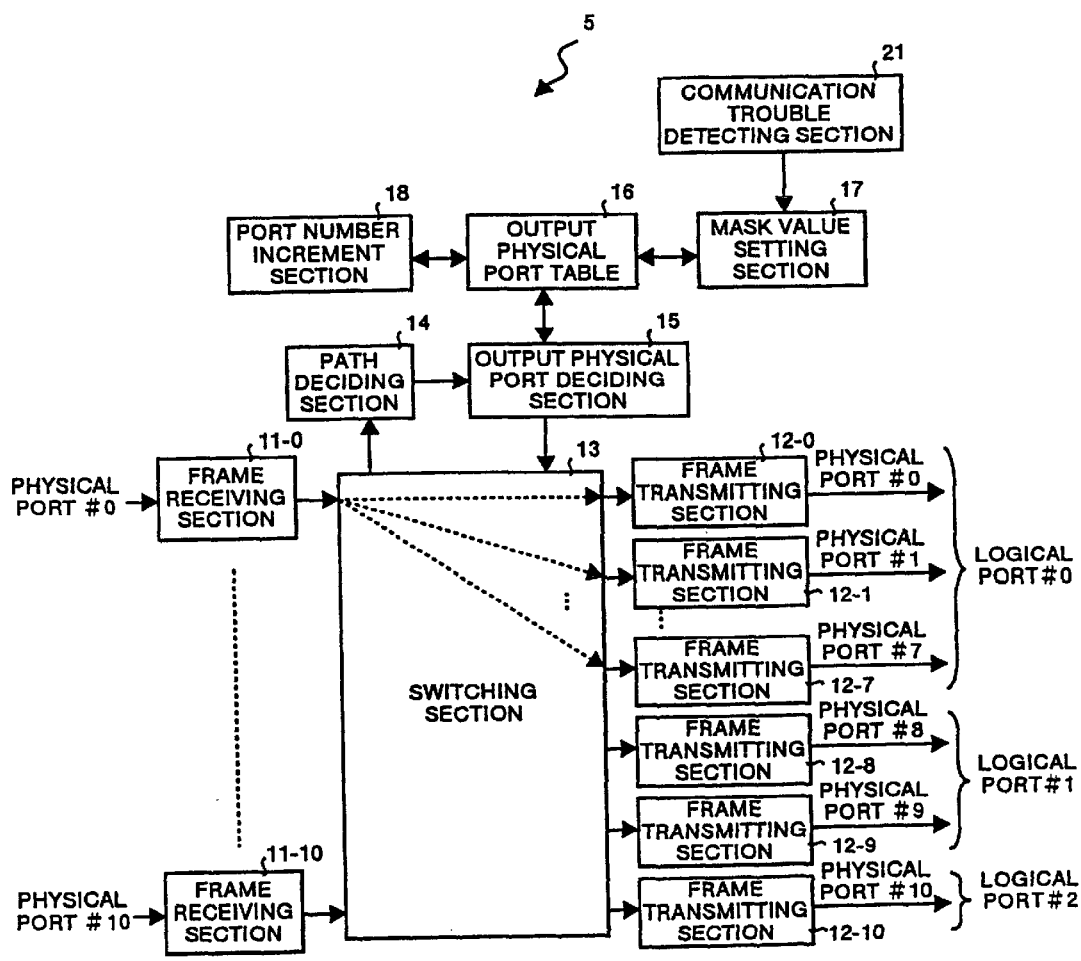
FIG. 23 is a block diagram showing configuration of a transmission equipment according to Embodiment 5 of the present invention.

At first, description is made for configuration of a transmission equipment. FIG. 23 is a block diagram showing configuration of a transmission equipment according to Embodiment 5 of the present invention. Description is made herein only for the configuration different from that of the transmission equipment 1 which has been explained in Embodiment 1. The transmission equipment 5 according to Embodiment 5 shown in FIG. 23 has configuration in which a communication trouble detecting section 21 is extensively connected to a mask value setting section 17.

The communication trouble detecting section 21 monitors output physical ports for the equipment, detects occurrence of any trouble as well as recovery from the trouble, and reports the state of the trouble or the recovery as well as a port number to the mask value setting section 17 to instruct the change in the mask value. The mask value setting section 17 changes a range of grouping according to this instruction of the change in the mask value, and excludes any output physical port which does not function or recovers the port from trouble.

Figure 24:
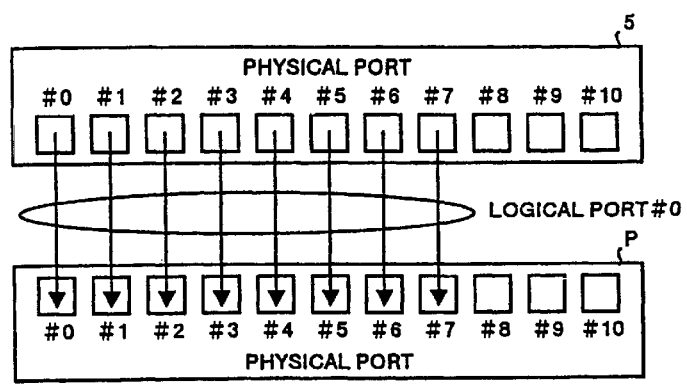
FIG. 24 is a simulated view for explaining a load-distribution transmitting method in the normal operation of the equipment according to Embodiment 5.
Figure 26:
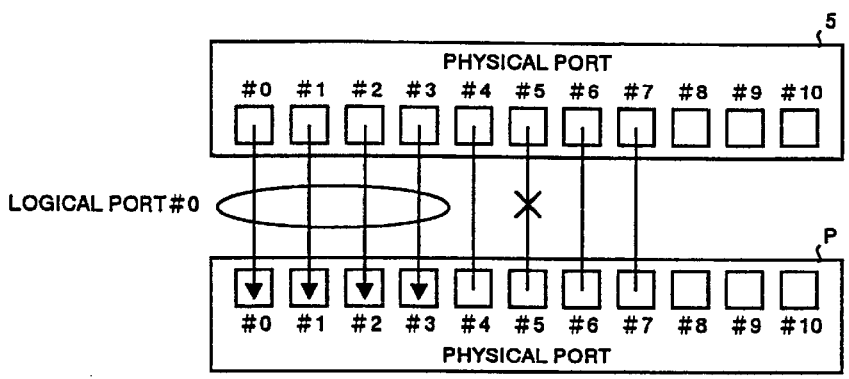
FIG. 26 is a simulated view for explaining a load-distribution transmitting method at a time some communication trouble occurs according to Embodiment 5.
Figure 27:
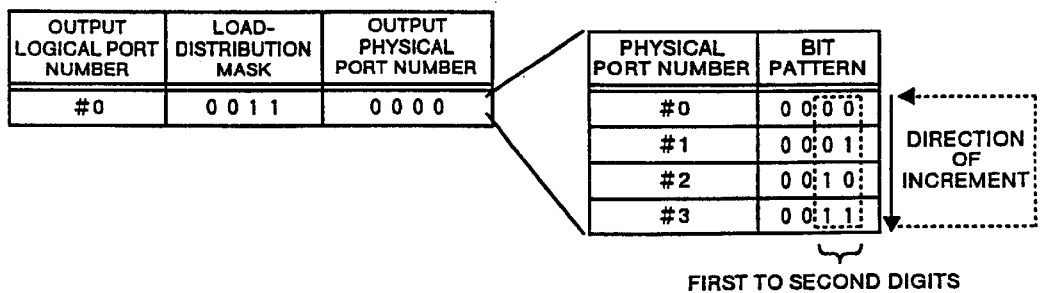
FIG. 27 is a view for explaining a method of changing an output physical port in the condition shown in FIG. 26.
Figure 28:
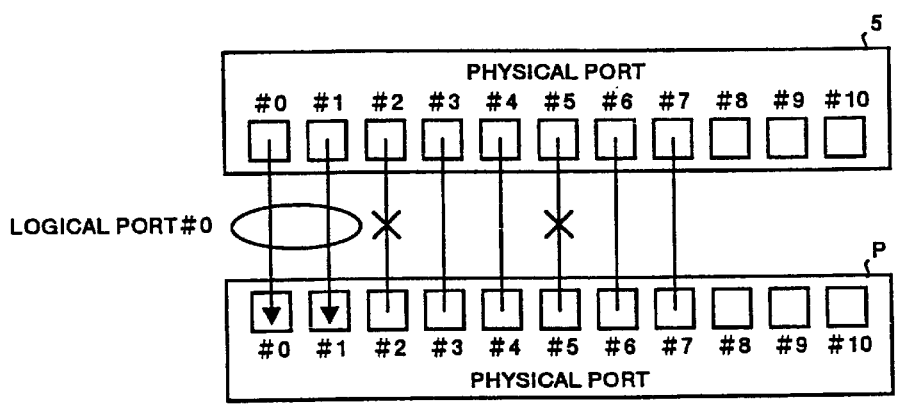
FIG. 28 is a simulated view for explaining a load-distribution transmitting method at a time other communication trouble occurs according to Embodiment 5.
Figure 29:
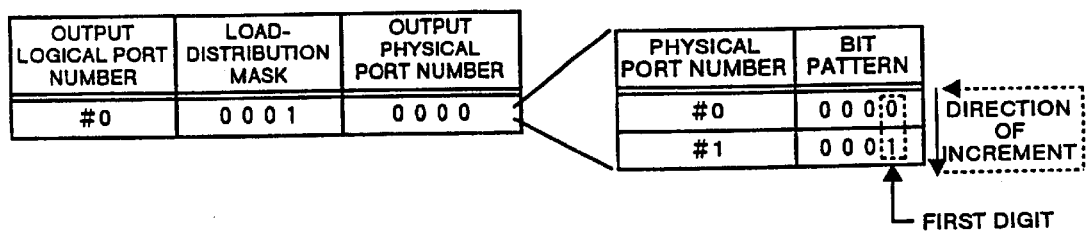
FIG. 29 is a view for explaining a method of changing an output physical port in the condition shown in FIG. 28.
Figure 30:
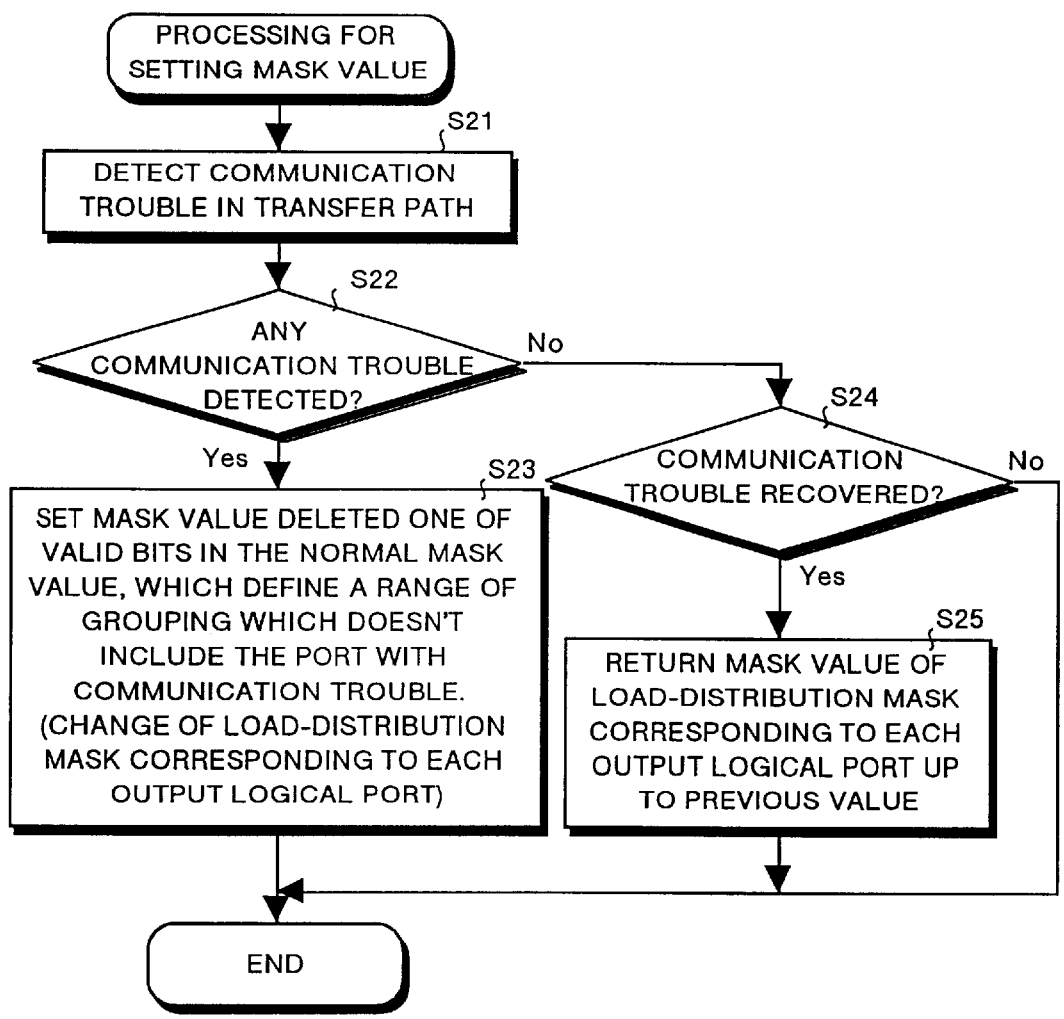
FIG. 30 is a flow chart for explaining a sequence of setting a mask value according to Embodiment 5.

Next description is made for the operations. FIG. 24 is a simulated view for explaining a load-distribution transmitting method in the normal operation of the equipment according to Embodiment 5, FIG. 25 is a view for explaining a method of changing an output physical port in the condition shown in FIG. 24, FIG. 26 is a simulated view for explaining a load-distribution transmitting method at a time communication trouble occurs, FIG. 27 is a view for explaining a method of changing an output physical port in the condition shown in FIG. 26, FIG. 28 is a simulated view for explaining a load-distribution transmitting method at a time other communication trouble occurs, FIG. 29 is a view for explaining a method of changing an output physical port in the condition shown in FIG. 28, and FIG. 30 is a flow chart for explaining a sequence of setting a mask value.

Figure 25:
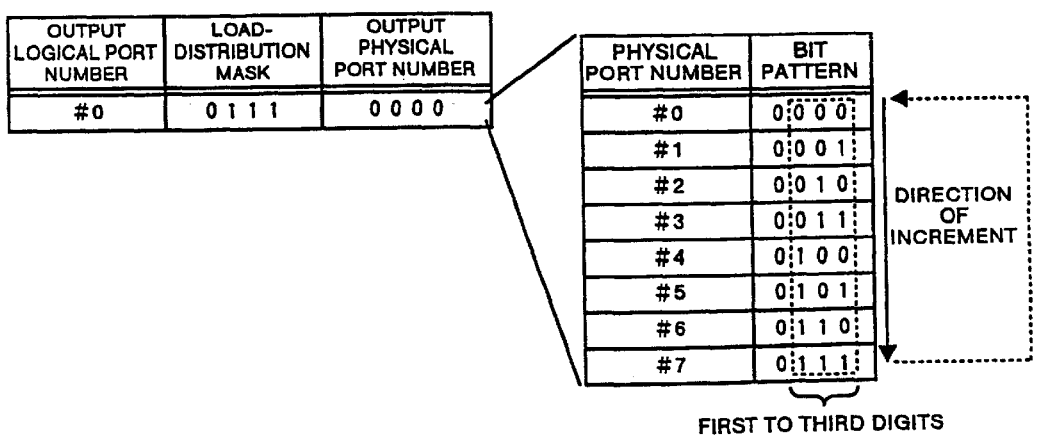
FIG. 25 is a view for explaining a method of changing an output physical port in the condition shown in FIG. 24.

At first, description is made for setting of a mask value in the normal operation of the equipment with reference to FIG. 24 and FIG. 25. FIG. 24 shows a grouping in a logical port #0, between a transmission equipment 5 and a transmission equipment P as a partner connected thereto via a network each according to Embodiment 5, assuming that physical ports in both of the equipments are connected to each other with the same physical port numbers respectively. In this case, eight ports of output physical ports #0 to #7 are included in a range (object) of grouping. This range of grouping is defined with the mask value in an output physical port table shown in FIG. 25.

FIG. 25 shows a portion of the output physical port table according to Embodiment 5. In FIG. 25, a mask value "0111" (binary) of a load-distribution mask and an initial value "0000" (binary) of an output physical port are correlated to the output logical port #0 and stored in the table. The mask value "0111" (binary) of the load-distribution mask indicates a range in which the last three digits (bits in the first to third digits) are variable. For this reason, in the range for grouping transfer paths shown in FIG. 24, switching of ports is executed together with each frame transmission in association with each operation of incrementing a port number within the output physical ports #0 to #7.

In Embodiment 5, a change for the mask value can be specified in the mask value setting section 17 according to detection of communication trouble or of recovery from the trouble in the communication trouble detecting section 21.

Next description is made for change of a mask value according to occurrence of communication trouble with reference to FIG. 26 and FIG. 27. FIG. 26 shows, concerning the logical port #0, a grouping with ports defined as a range including ports (#0–#3) with smaller numbers than a port number of an output physical port (#5) in which communication trouble occurs, which is different from the connected relation between the transmission equipment 5 and the transmission equipment P as a partner shown in FIG. 24. This decrease in the number of output physical ports indicates degradation of the band for transfer paths. In this case, the range reduced from eight ports of the output physical ports #0 and #7 to four ports #0 to #3 is a range (object) of grouping. This range of grouping is defined with the mask value in an output physical port table shown in FIG. 27.

FIG. 27 shows a portion of the output physical port table when only the mask value is changed in the correlation between the output logical port number and the load-distribution mask shown in FIG. 25. This change is executed so that the grouping can be set, by avoiding the output physical port #5 in which communication trouble occurs, within a range of ports with smaller numbers than the output physical port #5.

In FIG. 27, a mask value "0011" (binary) of a load-distribution mask and an initial value "0000" (binary) of an output physical port are correlated to the output logical port #0 and stored in the table. Namely, to realize degradation in a band of transfer paths according to occurrence of communication trouble, as shown in FIG. 27, it is required to delete a valid bit in a higher order digit among valid bits in the mask value in the normal operation. The mask value "0011" (binary) of the load-distribution mask indicates a range in which all bits in the first and second digits are variable. For this reason, in the range for grouping transfer paths shown in FIG. 26, switching of ports is executed together with each frame transmission in association with each operation of incrementing a port number within the output physical ports #0 to #3.

To further detail here about the operations of increment shown in FIG. 27, in a case of the mask value "0011" (binary), two bits comprising the first and second digits may be incremented one by one from "00" (binary). Namely, changes according to the increment are "00" (binary)-"01" (binary) -"10" (binary)-"11" (binary). Simply considering only those two bits, values obtained by the increment are changed like 0-1-2-3. Then, if the other two fixed bits (in the two higher order digits) are included in each of the values, the values obtained by the increment are changed like 0-1-2-3. Accordingly, the output physical port numbers obtained by the increment are #0-#1-#2-#3.

As described above, in the range of grouping shown in FIG. 26, frame transmission to the output physical port (#5) in which communication trouble occurs within the range of grouping shown in FIG. 24 is not executed, and for this reason, even if the band for transfer paths is reduced, load-distribution transmission can surely be realized.

Also, the change of a mask value can deal with a case where communication trouble occurs not only in one output physical port but also in each of a plurality of output physical ports. Namely, the range of grouping in FIG. 27 may further be degraded by changing the mask value. In this case, the mask value of the load-distribution mask may also be changed to a mask value defining a grouping in a range of ports provided in the further forward part from an output physical port having the smallest number of a plurality of output physical ports in each of which communication trouble occurs.

Next description is made for changing a mask value according to occurrence of a plurality of communication troubles with reference to FIG. 28 and FIG. 29. FIG. 28 shows, concerning the logical port #0, a grouping with ports defined as a range including ports (#0, #1) with smaller numbers than the port number of an output physical port (#2) in which further communication trouble occurs, which is different from the connected relation between the transmission equipment 5 and the transmission equipment P as a partner shown in FIG. 26. This decrease in the number of output physical ports indicates further degradation of the band for transfer paths. In this case, the range further reduced from four ports of the output physical ports #0 to #3 to two ports #0 to #1 is a range (object) of grouping. This range of grouping is defined with the mask value in an output physical port table shown in FIG. 29.

FIG. 29 shows a portion of the output physical port table when only the mask value is changed in the correlation between the output logical port number and the load-distribution mask shown in FIG. 25. This change is executed so that the grouping can be set, by avoiding the output physical ports #5 and #2 in each of which communication trouble occurs, within a range of ports with smaller numbers than the output physical port #2 which is the smallest number therein.

In FIG. 29, a mask value "0001" (binary) of a load-distribution mask and an initial value "0000" (binary) of an output physical port are correlated to the output logical port #0 and stored in the table. Namely, to realize degradation in a band of transfer paths according to occurrence of communication trouble, as shown in FIG. 29, the mask value is required to delete a valid bit in the higher order digit (second digit) among valid bits in the mask value in the normal operation. The mask value "0001" (binary) of the load-distribution mask obtained as a result indicates a range in which all bits only in the first digits are variable. For this reason, in the range for grouping transfer paths shown in FIG. 28, switching of ports is executed together with each frame transmission in association with each operation of incrementing a port number within the output physical ports #0 to #1.

To further detail here about the operations of increment shown in FIG. 29, in a case of the mask value "0001" (binary), one bit in each of only the first digit may be incremented one by one from "0" (binary). Namely, changes according to the increment are "0" (binary)-"1" (binary). Simply considering only this one bit, values obtained by the increment are changed like 0–1. Then, if the other three fixed bits (in the three higher order digits) are included in each of the values, the values obtained by the increment are changed like 0–1. Accordingly, the output physical port numbers obtained by the increment are #0–#1.

As described above, in the range of grouping shown in FIG. 28, frame transmission to the output physical port (#2) in which further communication trouble occurs within the range of grouping shown in FIG. 26 is not executed, and for this reason, even if the band for transfer paths is further reduced, load-distribution transmission can surely be realized.

Concrete description is made for the operations for setting a mask value with reference to FIG. 30. The processing for setting a mask value described below is executed with occurrence of communication trouble or recovery from the trouble as one of triggers. When a communication-troubled state is detected in one of output physical ports by the communication trouble detecting section 21 (step S21), determination is made as to whether the communication-troubled state indicates occurrence of communication trouble, recovery from the trouble, or a balanced state. If any communication trouble is detected (step S22), information on the communication trouble and an output physical port number in which the communication trouble has been detected are reported to the mask value setting section 17. Then, the processing shifts to step S23.

In step S23, a mask value with which a range for grouping ports with numbers smaller than the smallest port number of the output physical port numbers in each of which communication trouble occurs so far can be defined is set in the mask value setting section 17 according to the output physical port number(s) in which communication trouble occurs as shown in FIG. 26 or FIG. 28, and a pair of the mask value (load-distribution mask) and the output physical port number corresponding to the mask value are supplied to the output physical port table 16. With those operations, the mask value is changed in the output physical port table 16.

Also, if recovery from the trouble but not communication trouble is detected (step S24), the processing shifts to step S25, while if the balanced state but neither communication trouble nor recovery is detected (step S24), this processing for setting a mask value is ended.

In step S25, a mask value with which a range for grouping ports with numbers smaller than the smallest port number of the output physical port numbers in each of which communication trouble occurs excluding the recovered output physical port number can be defined is set in the mask value setting section 17 according to the output physical port number(s) in which the communication trouble having occurred as shown in FIG. 26 or FIG. 28 is recovered, and a pair of the mask value (load-distribution mask) and the output physical port number corresponding to the mask value are supplied to the output physical port table 16. With those operations, the mask value is changed in the output physical port table 16.

It should be noted that, in the step S25, there is sometimes a case where the processing is ended without returning the mask value to the original one because the definition is executed with the output physical port having the smallest number as a reference of the output physical port numbers in each of which communication trouble occurs. For example, in the communication-troubled state in FIG. 28, the change (returning) to the mask value "0011" (binary) shown in FIG. 27 is not executed unless the output physical port #2 which is a smaller number than #5 is recovered from the trouble even if the output physical port #5 is recovered therefrom.

As described above, with Embodiment 5, mask information corresponding to each of the output logical ports is changed and set to mask information for defining a range of grouping in which one or a plurality of output physical ports each with communication trouble having been detected are invalidated from the range of grouping according to the mask information, so that any output physical port in which communication trouble occurs can be separated from others. With this operation, communication trouble at the time of load-distribution transmission can securely be avoided.

Also, of bit patterns expressed by mask information corresponding to each of output physical ports, the mask information is changed to mask information for defining a range with a bit pattern up to a digit position in the further forward part beyond the digit position for a bit corresponding to at least one or a plurality of output physical ports in which communication trouble has been detected as a range of grouping, so that a grouping not including any output physical port having communication trouble can be acquired.

Also, when recovery from communication trouble is detected, the mask information is returned to the original mask information corresponding to each of the output logical ports, so that a correlation between the output logical port and the mask information can be returned to the initial state before the communication trouble occurs. With this operation, the system on the whole can automatically be recovered.

In the present invention, like Embodiment 6 described below, frame transmission may be realized under such conditions that a secure band is insured by degrading and changing a mask value according to occurrence of communication trouble related to an output physical port. It should be noted that the configuration according to Embodiment 5 is employed herein and the whole operations of load-distribution transmission follow those in Embodiment 1 (Refer to FIG. 4).

Figure 31:
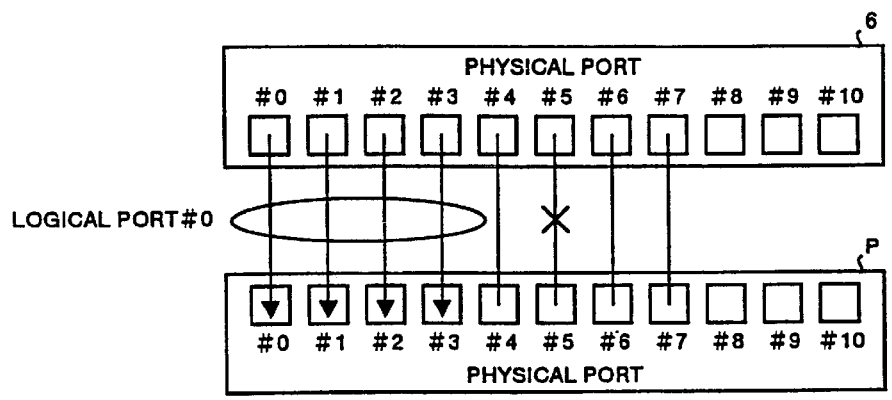
FIG. 31 is a simulated view for explaining a load-distribution transmitting method at a time some communication trouble occurs according to Embodiment 6.
Figure 33:
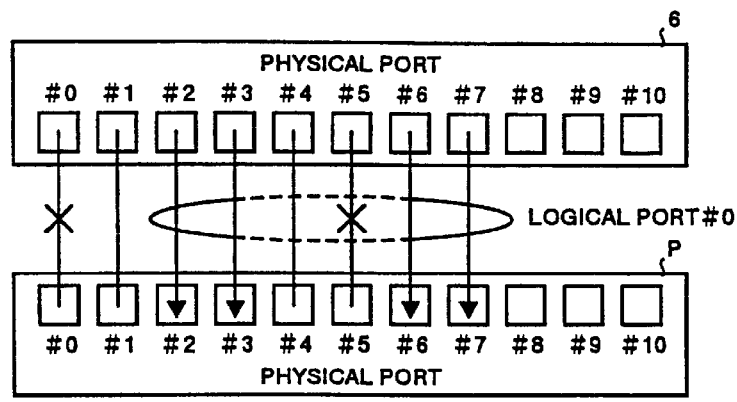
FIG. 33 is a simulated view for explaining a load-distribution transmitting method at a time other communication trouble occurs according to Embodiment 6.
Figure 34:
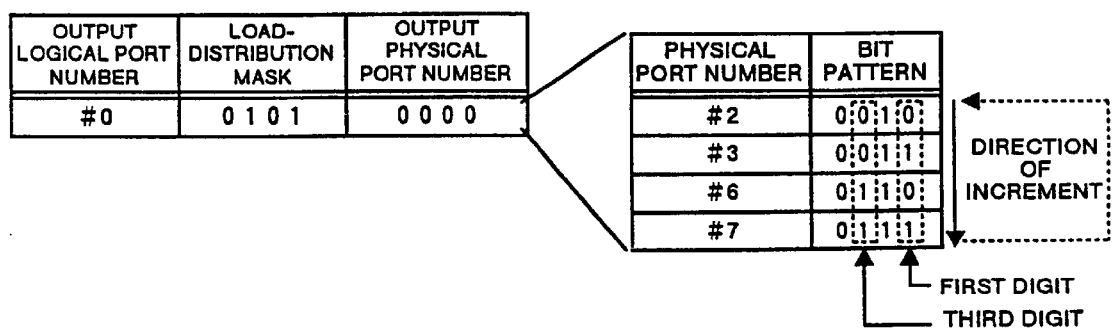
FIG. 34 is a view for explaining a method of changing an output physical port in the condition shown in FIG. 33.
Figure 35:
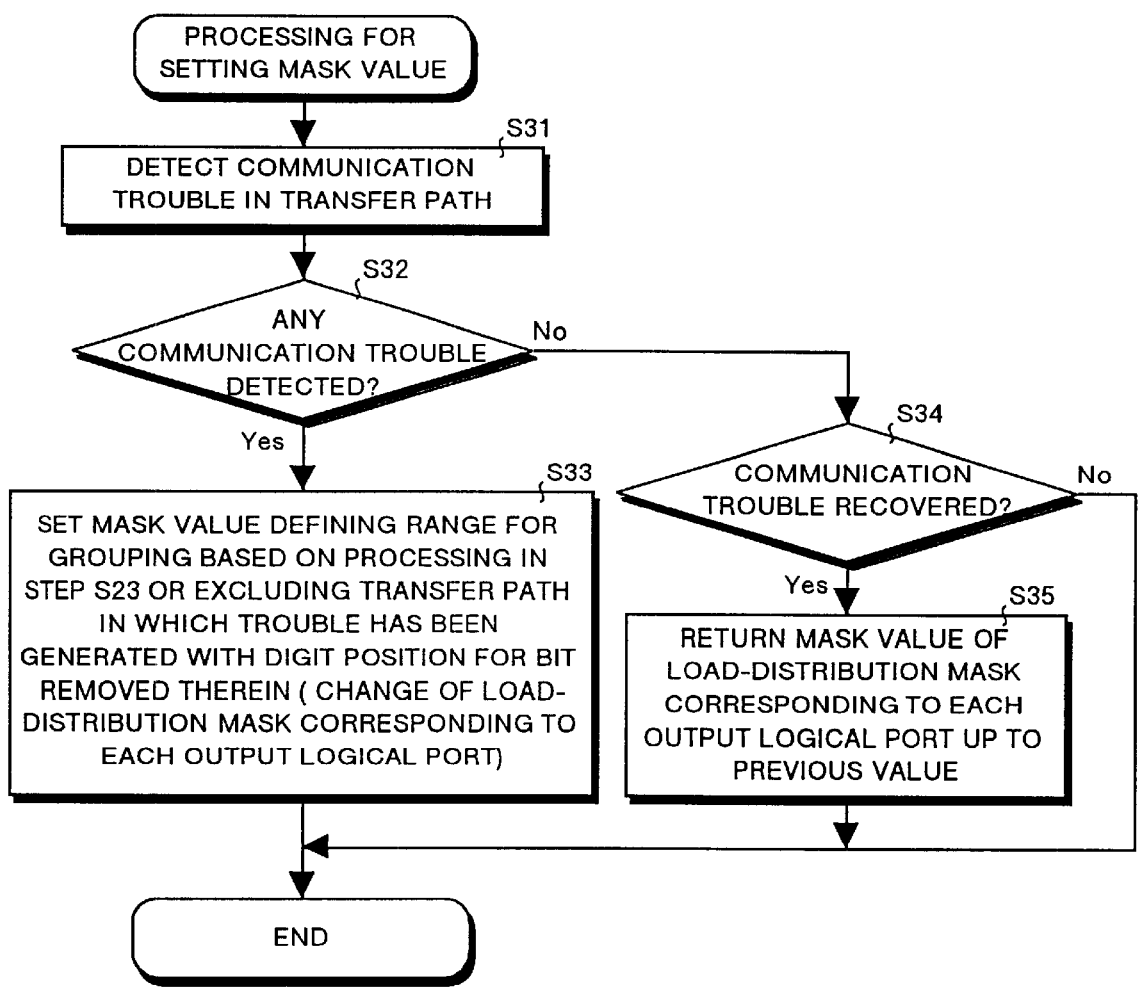
FIG. 35 is a flow chart for explaining a sequence of setting a mask value according to Embodiment 6.

Description is made herein only for the operations different from those in Embodiment 5. FIG. 31 is a simulated view for explaining a load-distribution transmitting method at a time some communication trouble occurs according to Embodiment 6, FIG. 32 is a view for explaining a method of changing an output physical port in the condition shown in FIG. 31, FIG. 33 is a simulated view for explaining a load-distribution transmitting method at a time other communication any trouble occurs according to Embodiment 6, FIG. 34 is a view for explaining a method of changing an output physical port in the condition shown in FIG. 33, and FIG. 35 is a flow chart for explaining a sequence of setting a mask value according to Embodiment 6.

Also in Embodiment 6, when first communication trouble occurs, it is possible to acquire a mask value for defining a grouping within a range including ports with a smaller number than the port number of the output physical port in which communication trouble occurs like in the example of FIG. 26 explained in Embodiment 5. Description is made for the acquisition of the mask value with reference to FIG. 31 and FIG. 32. FIG. 31 shows, concerning the logical port #0, a grouping defining ports as a range including up to a port (#3) in the further forward part (ports with smaller numbers) from an output physical port (#5) in which communication trouble occurs. At occurrence of the first communication trouble, the band for transfer paths is degraded. In this case, the range reduced from eight ports of the output physical ports #0 and #7 in the normal operation to four ports #0 to #3 is a range (object) of grouping. This range of grouping is defined with the mask value in an output physical port table shown in FIG. 32.

Figure 32:
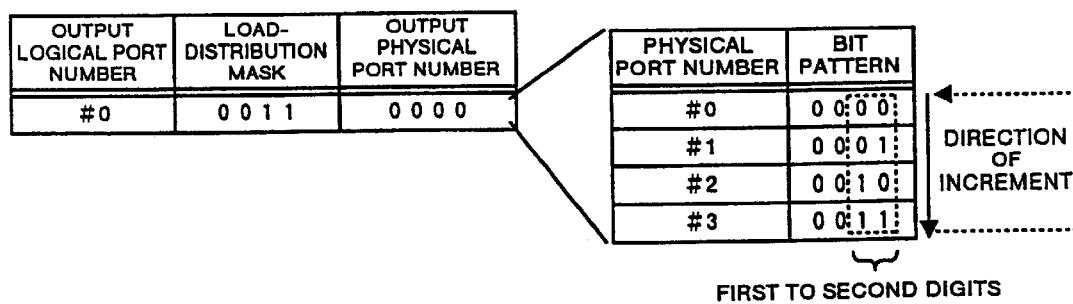
FIG. 32 is a view for explaining a method of changing an output physical port in the condition shown in FIG. 31.

FIG. 32 shows a portion of the output physical port table when only the mask value is changed in the correlation between the output logical port number and the load-distribution mask in the normal operation. This change is executed so that the grouping can be set, by avoiding the output physical port #5 in which communication trouble occurs, within a range of ports with smaller numbers than the output physical port #5.

In FIG. 32, a mask value "0011" (binary) of a load-distribution mask and an initial value "0000" (binary) of an output physical port are correlated to the output logical port #0 and stored in the table. Namely, to realize degradation in a band of transfer paths according to occurrence of the first communication trouble, as shown in FIG. 32, the mask value is required to delete a valid bit in a higher order digit among valid bits in the mask value in the normal operation. The mask value "0011" (binary) of the load-distribution mask indicates a range in which all bits in the first and second digits are variable. For this reason, in the range for grouping transfer paths shown in FIG. 31, switching of ports is executed together with each frame transmission in association with each operation of incrementing a port number within the output physical ports #0 to #3.

To further detail here about the operations of increment shown in FIG. 32, in a case of the mask value "0011" (binary), two bits comprising the first and second digits may be incremented one by one from "00" (binary). Namely, changes according to the increment are "00" (binary)-"01" (binary) -"10" (binary)-"11" (binary). Simply considering only those two bits, values obtained by the increment are changed like 0 -1-2-3. Then, if the other two fixed bits (in the two higher order digits) are included in each of the values, the values obtained by the increment are changed like 0-1-2-3. Accordingly, the output physical port numbers obtained by the increment are #0-#1-#2-#3.

As described above, in the range of grouping shown in FIG. 31, frame transmission to the output physical port (#5) in which communication trouble occurs within the range of grouping in the normal operation is not executed, and for this reason, even if the band for transfer paths is reduced, load-distribution transmission can surely be realized.

Also, the change of a mask value can deal with a case where communication trouble occurs not only in one output physical port but also in a plurality of output physical ports. Namely, the range of grouping in FIG. 31 is possibly moved by changing the mask value. In this case, the mask value of the load-distribution mask may be changed to a mask value defining a grouping in a range obtained by avoiding a plurality of output physical ports in each of which communication trouble occurs.

Next description is made for changing a mask value according to occurrence of a plurality of communication trouble with reference to FIG. 33 and FIG. 34. FIG. 33 shows, concerning the logical port #0, a grouping defining a range obtained by avoiding each of output physical ports (#1, #5) in which communication trouble occurs within the original range of grouping in the normal operation, which is different from the connected relation between the transmission equipment 6 and the transmission equipment P as a partner shown in FIG. 31. This grouping indicates degradation as well as change of the band for transfer paths. In this case, the range in which four ports of the output physical ports #0 to #3 are changed to ports #2, #3, #6 and #7 is a range (object) of grouping. This range of grouping is defined with the mask value in an output physical port table shown in FIG. 34.

FIG. 34 shows a portion of the output physical port table when only the mask value is further changed in the correlation between the output logical port number and the load-distribution mask shown in FIG. 32. This change is executed so that a load-shareable grouping can be set, by avoiding the output physical ports #5 and #1 each with communication trouble, within the original range of grouping.

In FIG. 34, a mask value "0101" (binary) of a load-distribution mask and an initial value "0000" (binary) of an output physical port are correlated to the output logical port #0 and stored in the table. Namely, to realize degradation and change in a band of transfer paths according to occurrence of communication trouble, as shown in FIG. 34, the mask value is required to set (including deletion) valid bits of the number of valid bits (in three lower order digits) in the normal operation. The mask value "0101" (binary) of the load-distribution mask obtained as a result indicates a range in which bits in the first and third digits are variable. For this reason, in the range for grouping transfer paths shown in FIG. 33, switching of ports is executed together with each frame transmission in association with each operation of incrementing a port number within the output physical ports #2, #3, #6 and #7.

To further detail here about the operations of increment shown in FIG. 34, in a case of the mask value "0101" (binary), two bits comprising the first and third digits may be incremented one by one from "00" (binary). Namely, changes according to the increment are "00" (binary)-"01" (binary) -"10" (binary) "11" (binary). Simply considering only those two bits, values obtained by the increment are changed like 0 -1-2-3, but if the other two fixed bits (in the second and fourth digits) are included in each of the values, the values obtained by the increment are changed like 2-3-6-7. Accordingly, the output physical port numbers obtained by the increment are #2-#3-#6-#7.

As described above, in the range of grouping shown in FIG. 33, frame transmission to the output physical port (#2) in which further communication trouble occurs within the original range of grouping shown in the normal operation is not executed, and for this reason, even if a band for transfer paths to be used is changed within the original band, load-distribution transmission can surely be realized.

Concrete description is made for the operations for setting a mask value with reference to FIG. 35. The processing for setting a mask value described below is executed with occurrence of communication trouble or recovery from the trouble as one of triggers. When a communication-troubled state is detected in one of output physical port numbers by the communication trouble detecting section 21 (step S31), determination is made as to whether the communication-troubled state indicates occurrence of communication trouble, recovery from the trouble, or a balanced state. If any communication trouble is detected (step S32), information on the communication trouble and an output physical port number in which the communication trouble has been detected are reported to the mask value setting section 17. Then, the processing shifts to step S33.

In step S33, a mask value with which a range for grouping ports with numbers smaller than the smallest port number of the output physical port numbers in which communication trouble occurs so far can be defined is set in the mask value setting section 17 according to the output physical port number(s) when the first communication trouble occurs as shown in FIG. 31, and a pair of the mask value (load-distribution mask) and the output physical port number corresponding to the mask value are supplied to the output physical port table 16. With those operations, the mask value is changed in the output physical port table 16.

Or, a mask value with which a range of grouping can be defined within the original range of grouping in the normal operation by avoiding any output physical port numbers in which communication trouble occurs so far is set in the mask value setting section 17 according to the output physical port number(s) when a plurality of communication trouble occur as shown in FIG. 33, and a pair of the mask value (load-distribution mask) and the output physical port number corresponding to the mask value are supplied to the output physical port table 16. With those operations, the mask value is changed in the output physical port table 16.

Also, if recovery from the trouble but not communication trouble is detected (step S34), the processing shifts to step S35, while if a balanced state but neither communication trouble nor recovery is detected (step S34), this processing for setting a mask value is ended.

In step S35, a mask value with which the range for grouping effected when this recovered output physical port number has been used can be defined is set in the mask value setting section 17 according to the output physical port number(s) in which the communication trouble having occurred as shown in FIG. 31 or FIG. 33 is recovered, and a pair of the mask value (load-distribution mask) and the output physical port number corresponding to the mask value are supplied to the output physical port table 16. With those operations, the mask value is changed in the output physical port table 16.

It should be noted that, in the step S35, there are some cases where the mask value is not always returned to the previous mask value, but is further changed, or the number of digits is increased within the original range of grouping according to the state of recovery. For example, in the communication-troubled state as shown in FIG. 33, the mask value is not returned to the range of grouping shown in FIG. 31 unless the output physical port #1 which is the smaller number is recovered from the trouble even if the output physical port #5 is recovered therefrom.

As described above, with Embodiment 6, in addition to the effects in common with Embodiment 5, the mask information is changed to mask information for defining a range of grouping obtained by excluding digit positions for bits, of a bit pattern expressed with mask information corresponding to each of output logical ports, corresponding to at least one or a plurality of output physical ports each with communication trouble having been detected, so that it is possible to acquire a grouping to which no output physical port with communication trouble belongs.

The present invention may realize, like Embodiment 7 described below, frame transmission under such conditions that a secure band is insured by degrading a mask value according to an overloaded state (a condition where an amount of information is more than a specified value) related to an output physical port. It should be noted that the whole operations of load-distribution transmission follow those in Embodiment 1 (Refer to FIG. 4).

Figure 36:
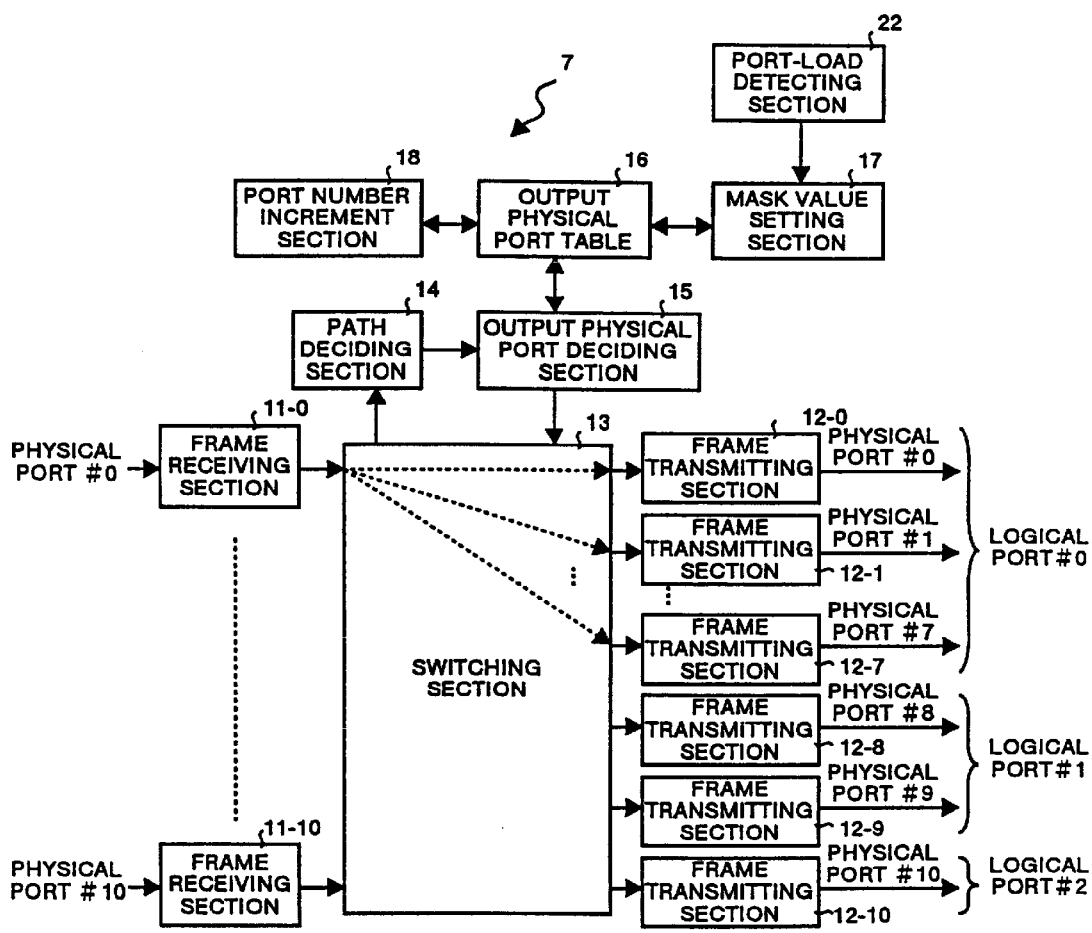
FIG. 36 is a block diagram showing configuration of a transmission equipment according to Embodiment 7 of the present invention.

At first, description is made for configuration of a transmission equipment. FIG. 36 is a block diagram showing configuration of a transmission equipment according to Embodiment 7 of the present invention. Description is made herein only for the configuration different from that of the transmission equipment 1 which has been explained in Embodiment 1. The transmission equipment 7 according to Embodiment 7 shown in FIG. 36 has configuration in which a port-load detecting section 22 is extensively connected to a mask value setting section 17.

The port-load detecting section 22 monitors a loaded state to each output physical port for the equipment, detects how the load is changing to a load (overload) exceeding a threshold value or to a load (normal load) not more than the threshold value, and reports the loaded state as well as a port number to the mask value setting section 17 to instruct the change in the mask value. The mask value setting section 17 changes a range of grouping according to this instruction of the change in the mask value, and excludes any output physical port with overload detected. Namely, a load-distribution transmission is realized in Embodiment 7 by using a lighter-loaded output physical port.

Figure 37:
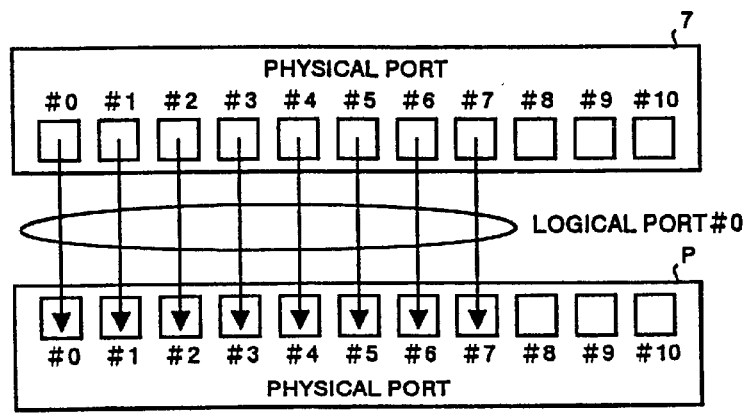
FIG. 37 is a simulated view for explaining a load-distribution transmitting method in the normal operation of the equipment according to Embodiment 7.
Figure 39:
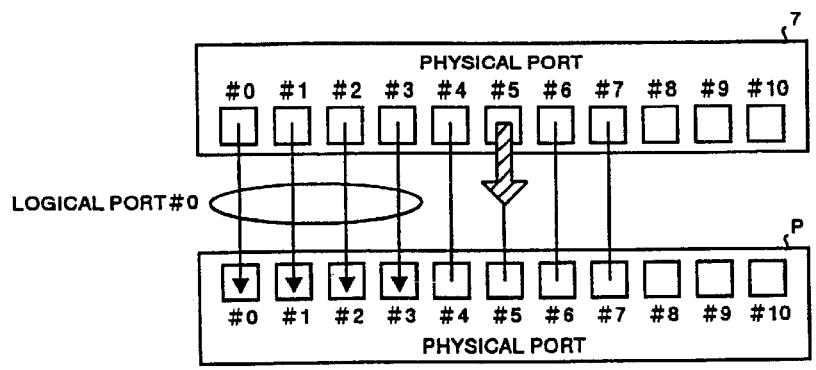
FIG. 39 is a simulated view for explaining a load-distribution transmitting method at a time some overload occurs according to Embodiment 7.
Figure 40:
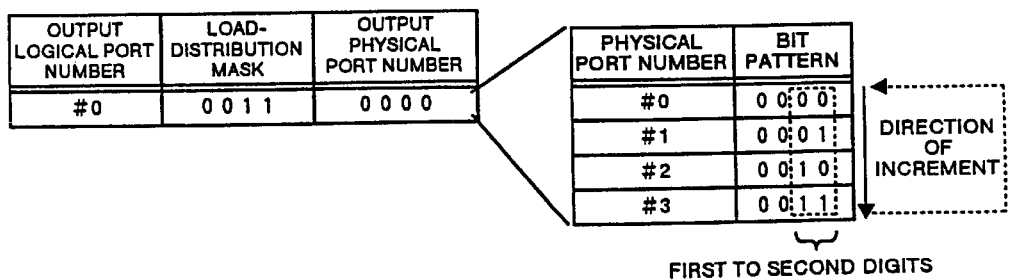
FIG. 40 is a view for explaining a method of changing an output physical port in the condition shown in FIG. 39.
Figure 41:
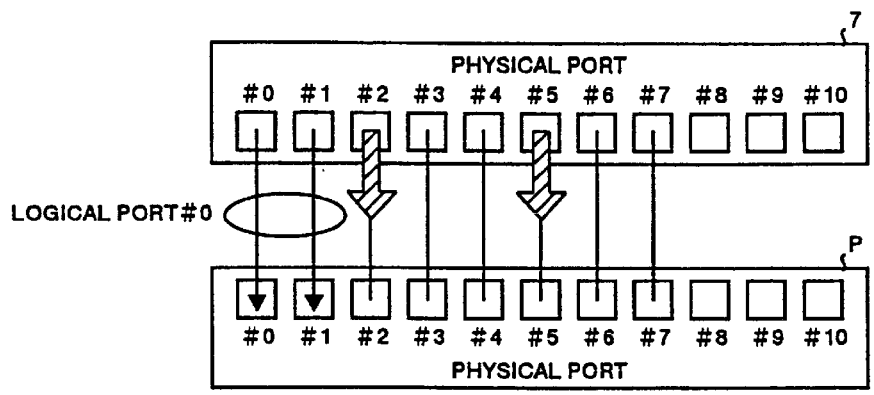
FIG. 41 is a simulated view for explaining a load-distribution transmitting method at a time other overload occurs according to Embodiment 7.
Figure 42:
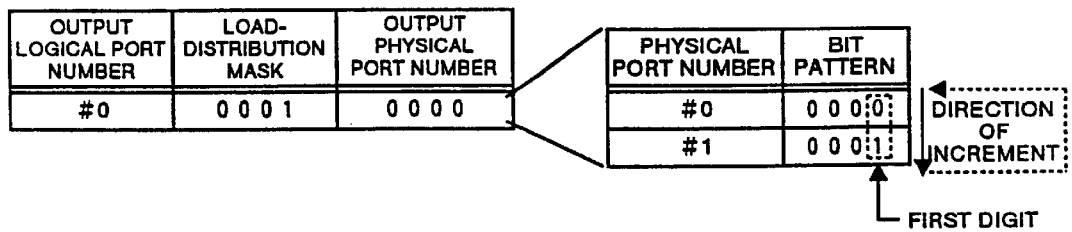
FIG. 42 is a view for explaining a method of changing an output physical port in the condition shown in FIG. 41.
Figure 43:
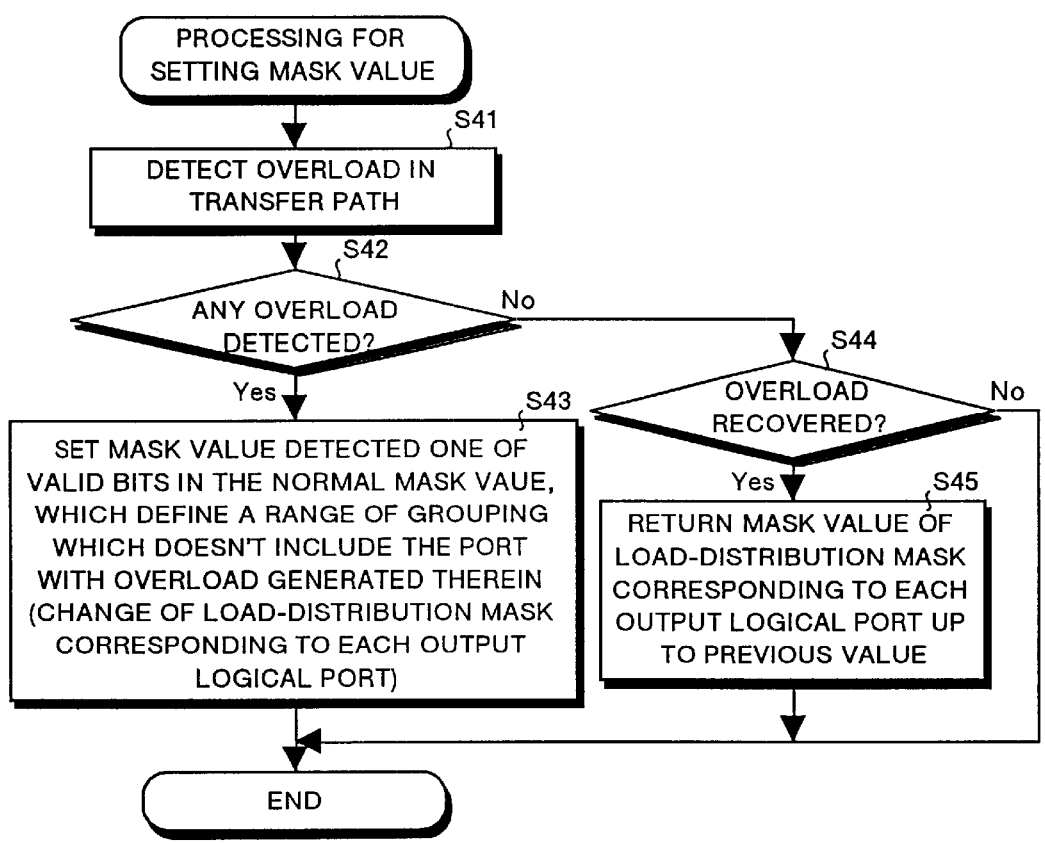
FIG. 43 is a flow chart for explaining a sequence of setting a mask value according to Embodiment 7.

Next description is made for the operations. FIG. 37 is a simulated view for explaining a load-distribution transmitting method in the normal operation of the equipment according to Embodiment 7, FIG. 38 is a view for explaining a method of changing an output physical port in the condition shown in FIG. 37, FIG. 39 is a simulated view for explaining a load-distribution transmitting method at a time an overload occurs, FIG. 40 is a view for explaining a method of changing an output physical port in the condition shown in FIG. 39, FIG. 41 is a simulated view for explaining a load-distribution transmitting method at a time other overload occurs, FIG. 42 is a view for explaining a method of changing an output physical port in the condition shown in FIG. 41, and FIG. 43 is a flow chart for explaining a sequence of setting a mask value.

Figure 38:
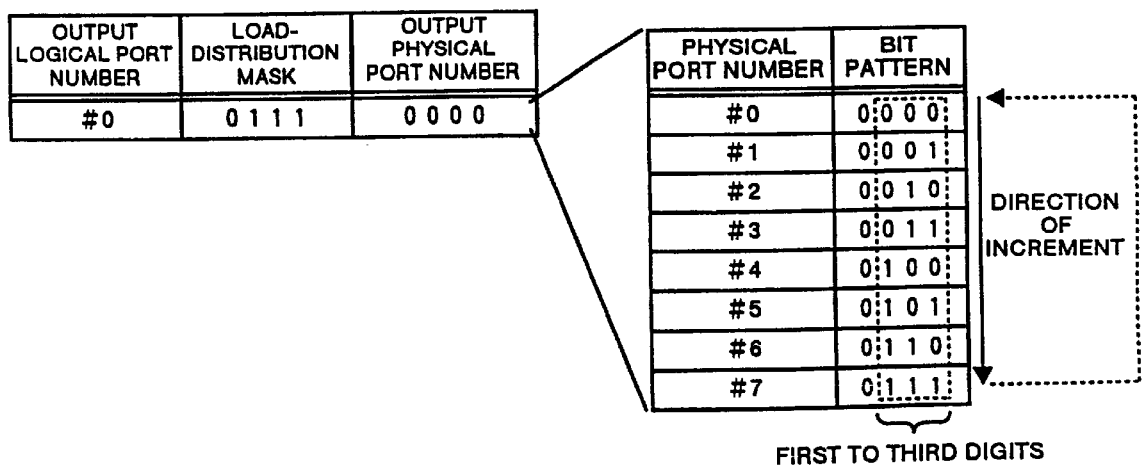
FIG. 38 is a view for explaining a method of changing an output physical port in the condition shown in FIG. 37.

At first, description is made for setting of a mask value in the normal operation of the equipment with reference to FIG. 37 and FIG. 38. FIG. 37 shows a grouping in a logical port #0, between a transmission equipment 7 and a transmission equipment P as a partner connected thereto via a network each according to Embodiment 7, assuming that physical ports in both of the equipments are connected to each other with the same physical port numbers respectively. In this case, eight ports of output physical ports #0 to #7 are included in a range (object) of grouping. This range of grouping is defined with the mask value in an output physical port table shown in FIG. 38. In FIG. 37, the number of I/O physical ports is the same as that in Embodiment 1.

FIG. 38 shows a portion of the output physical port table according to Embodiment 7. In FIG. 38, a mask value "0111" (binary) of a load-distribution mask and an initial value "0000" (binary) of an output physical port are correlated to the output logical port #0 and stored in the table. The mask value "0111" (binary) of the load-distribution mask indicates a range in which the last three digits (bits in the first to third digits) are variable. For this reason, in the range for grouping transfer paths shown in FIG. 37, switching of ports is executed together with each frame transmission in association with each operation of incrementing a port number within the output physical ports #0 to #7.

In Embodiment 7, a change for the mask value can be specified in the mask value setting section 17 according to detection of an overload or of elimination of the overload in the port-load detecting section 22.

Next description is made for the change of a mask value according to occurrence of an overload with reference to FIG. 39 and FIG. 40. FIG. 39 shows, concerning a logical port #0, a grouping defining ports as a range including ports (#0–#3) with smaller numbers than a port number of an output physical port (#5) in which an overload occurs, which is different from the connected relation between the transmission equipment 7 and the transmission equipment P as a partner shown in FIG. 37. This decrease in the number of output physical ports indicates degradation of the band for transfer paths. In this case, the range reduced from eight ports of the output physical ports #0 and #7 to four ports #0 to #3 is a range (object) of grouping. This range of grouping is defined with the mask value in an output physical port table shown in FIG. 40.

FIG. 40 shows a portion of the output physical port table when only the mask value is changed in the correlation between the output logical port number and the load-distribution mask shown in FIG. 38. This change is executed so that the grouping can be set, by avoiding the output physical port #5 in which an overload occurs, within a range of ports with smaller numbers than the output physical port #5.

In FIG. 40, a mask value "0011" (binary) of a load-distribution mask and an initial value "0000" (binary) of an output physical port are correlated to the output logical port #0 and stored in the table. Namely, to realize degradation in a band of transfer paths according to occurrence of an overload, as shown in FIG. 40, it is required to delete a valid bit in a higher order digit among valid bits in the mask value in the normal operation. The mask value "0011" (binary) of the load-distribution mask indicates a range in which all bits in the first and second digits are variable. For this reason, in the range for grouping transfer paths shown in FIG. 39, switching of ports is executed together with each frame transmission in association with each operation of incrementing a port number within the output physical ports #0 to #3.

To further detail here about the operations of increment shown in FIG. 40, in a case of the mask value "0011" (binary), two bits comprising the first and second digits may be incremented one by one from "00" (binary). Namely, changes according to the increment are "00" (binary)-"01" (binary)-"10" (binary)-"11" (binary). Simply considering only those two bits, values obtained by the increment are changed like 0-1-2-3. Then, if the other two fixed bits (in the two higher order digits) are included in each of the values, the values obtained by the increment are changed like 0-1-2-3. Accordingly, the output physical port numbers obtained by the increment are #0-#1-#2-#3.

As described above, in the range of grouping shown in FIG. 39, frame transmission to the output physical port (#5) in which an overload occurs within the range of grouping shown in FIG. 37 is not executed, and for this reason, even if the band for transfer paths is reduced, load-distribution transmission can surely be realized.

Also, the change of a mask value can deal with a case where an overload occurs not only in one output physical port but also in each of a plurality of output physical ports. Namely, the range of grouping in FIG. 40 may further be degraded by changing the mask value. In this case, the mask value of the load-distribution mask may also be changed to a mask value defining a grouping in a range of ports with smaller numbers than an output physical port having the smallest number of a plurality of output physical ports each in which an overload occurs.

Next description is made for changing a mask value according to occurrence of a plurality of overload with reference to FIG. 41 and FIG. 42. FIG. 41 shows, concerning a logical port #0, a grouping defining ports as a range including ports (#0, #1) with smaller numbers than the port number of an output physical port (#2) in which a further overload occurs, which is different from the connected relation between the transmission equipment 7 and the transmission equipment P as a partner shown in FIG. 39. This decrease in the number of output physical ports indicates further degradation of the band for transfer paths. In this case, the range further reduced from four ports of the output physical ports #0 to #3 to two ports #0 to #1 is a range (object) of grouping. This range of grouping is defined with the mask value in an output physical port table shown in FIG. 42.

FIG. 42 shows a portion of the output physical port table when only the mask value is changed in the correlation between the output logical port number and the load-distribution mask shown in FIG. 38. This change is executed so that the grouping can be set, by avoiding the output physical ports #5 and #2 each in which an overload occurs, within a range of ports with smaller numbers than the output physical port #2 which is the smallest number in the overloaded output physical ports.

In FIG. 42, a mask value "0001" (binary) of a load-distribution mask and an initial value "0000" (binary) of an output physical port are correlated to the output logical port #0 and stored in the table. Namely, to realize degradation in a band of transfer paths according to occurrence of an overload, as shown in FIG. 42, the mask value is required to delete a valid bit in the higher order digit (second digit) among valid bits in the mask value in the normal operation. The mask value "0001" (binary) of the load-distribution mask obtained as a result indicates a range in which all bits only in the first digit are variable. For this reason, in the range for grouping transfer paths shown in FIG. 41, switching of ports is executed together with each frame transmission in association with each operation of incrementing a port number within the output physical ports #0 to #1.

To further detail here about the operations of increment shown in FIG. 42, in a case of the mask value "0001" (binary), one bit in only the first digit may be incremented one by one from "0" (binary). Namely, changes according to the increment are "0" (binary)- "1" (binary). Simply considering only this one bit, values obtained by the increment are changed like 0 –1. Then, if the other three fixed bits (in the three higher order digits) are included in each of the values, the values obtained by the increment are changed like 0–1. Accordingly, the output physical port numbers obtained by the increment are #0–#1.

As described above, in the range of grouping shown in FIG. 41, frame transmission to the output physical port (#2) in which a further overload occurs within the range of grouping shown in FIG. 39 is not executed, and for this reason, even if the band for transfer paths is further reduced, load-distribution transmission can surely be realized.

Concrete description is made for the operations for setting a mask value with reference to FIG. 43. The processing for setting a mask value described below is executed with occurrence of an overload or elimination of an overload as one of triggers. When a loaded state is detected in one of output physical ports by the port-load detecting section 22 (step S41), determination is made as to whether the loaded state indicates an overload, elimination of the overload, or a balanced state. If any overload is detected (step S42), information on the overload and an output physical port number in which the overload has been detected are reported to the mask value setting section 17. Then, the processing shifts to step S43.

In step S43, a mask value with which a range for grouping ports with numbers smaller than the smallest port number of the output physical port numbers each in which an overload occurs so far can be defined is set in the mask value setting section 17 according to the output physical port number(s) in which an overload occurs as shown in FIG. 39 or FIG. 41, and a pair of the mask value (load-distribution mask) and the output physical port number corresponding to the mask value are supplied to the output physical port table 16. With those operations, the mask value is changed in the output physical port table 16.

Also, if elimination of the overload but not the overload is detected (step S44), the processing shifts to step S45, while if the balanced state but neither the overload nor elimination of the overload thereof is detected (step S44), this processing for setting a mask value is ended.

In step S45, a mask value with which a range for grouping ports with numbers smaller than the smallest port number of the output physical port numbers in which an overload occurs excluding the eliminated output physical port number can be defined is set in the mask value setting section 17 according to the output physical port number(s) in which the overload occurring as shown in FIG. 39 or FIG. 41 is eliminated, and a pair of the mask value (load-distribution mask) and the output physical port number corresponding to the mask value are supplied to the output physical port table 16. With those operations, the mask value is changed in the output physical port table 16.

It should be noted that, in the step S45, there is sometimes a case where the processing is ended without returning the mask value to the original one because the definition is executed with the output physical port having the smallest number as a reference of the output physical port numbers each in which an overload occurs. For example, in the overloaded state in FIG. 41, the change (returning) to the mask value "0011" (binary) shown in FIG. 40 is not executed unless an overload of the output physical port #2 which is the smaller number eliminates the overload even if an overload of the output physical port #5 eliminates the overload.

As described above, with Embodiment 7, mask information corresponding to each of the output logical ports is changed and set to mask information for defining a range of grouping in which one or a plurality of output physical ports each in overloaded state having been detected are invalidated from the range of grouping according to the mask information, so that any output physical port in the overloaded state can be separated from others. With this operation, uniformity of a load at the time of load-distribution transmission can be achieved.

Also, of bit patterns expressed by mask information corresponding to each of output logical ports, the mask information is changed to mask information for defining a range with a bit pattern up to a digit position in the further forward part beyond the digit position for a bit corresponding to at least one or a plurality of output physical ports each in which an overload has been detected as a range of grouping, so that a grouping not including any output physical port in the overloaded state can be acquired.

Also, when the elimination of the overloaded state is detected, the mask information is returned to the original mask information corresponding to each of the output logical ports, so that a correlation between the output logical port and the mask information can be returned to the initial state before the overload occurs. With this operation, the system on the whole can automatically be recovered.

In the present invention may realize, like in Embodiment 8 described below, frame transmission may be realized under such conditions that a secure band is insured by degrading and changing a mask value according to an overloaded state related to an output physical port. It should be noted that the configuration according to Embodiment 7 is employed herein and the whole operations of load-distribution transmission follow those in Embodiment 1 (Refer to FIG. 4).

Figure 44:
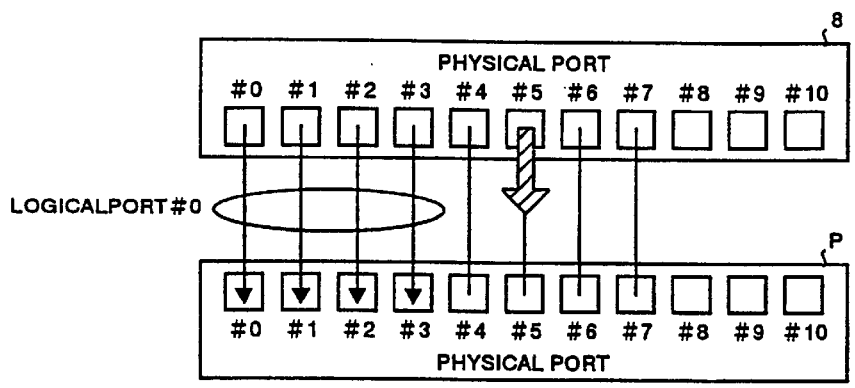
FIG. 44 is a simulated view for explaining a load-distribution transmitting method at a time some overload occurred according to Embodiment 8.
Figure 46:
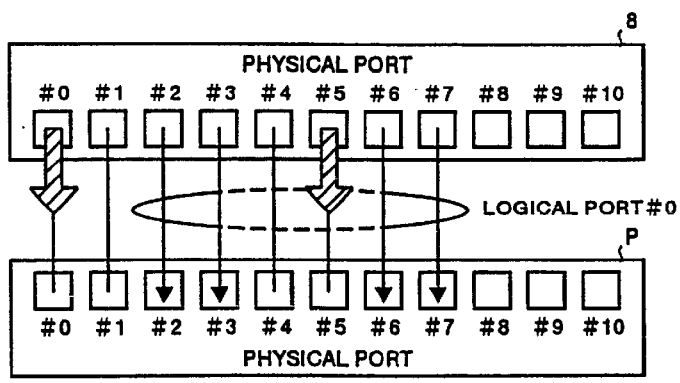
FIG. 46 is a simulated view for explaining a load-distribution transmitting method at a time other overload occurred according to Embodiment 8.
Figure 47:
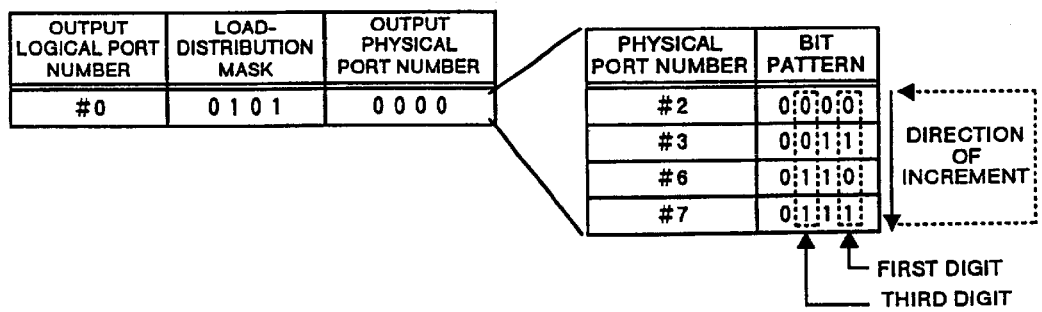
FIG. 47 is a view for explaining a method of changing an output physical port in the condition shown in FIG. 46.
Figure 48:
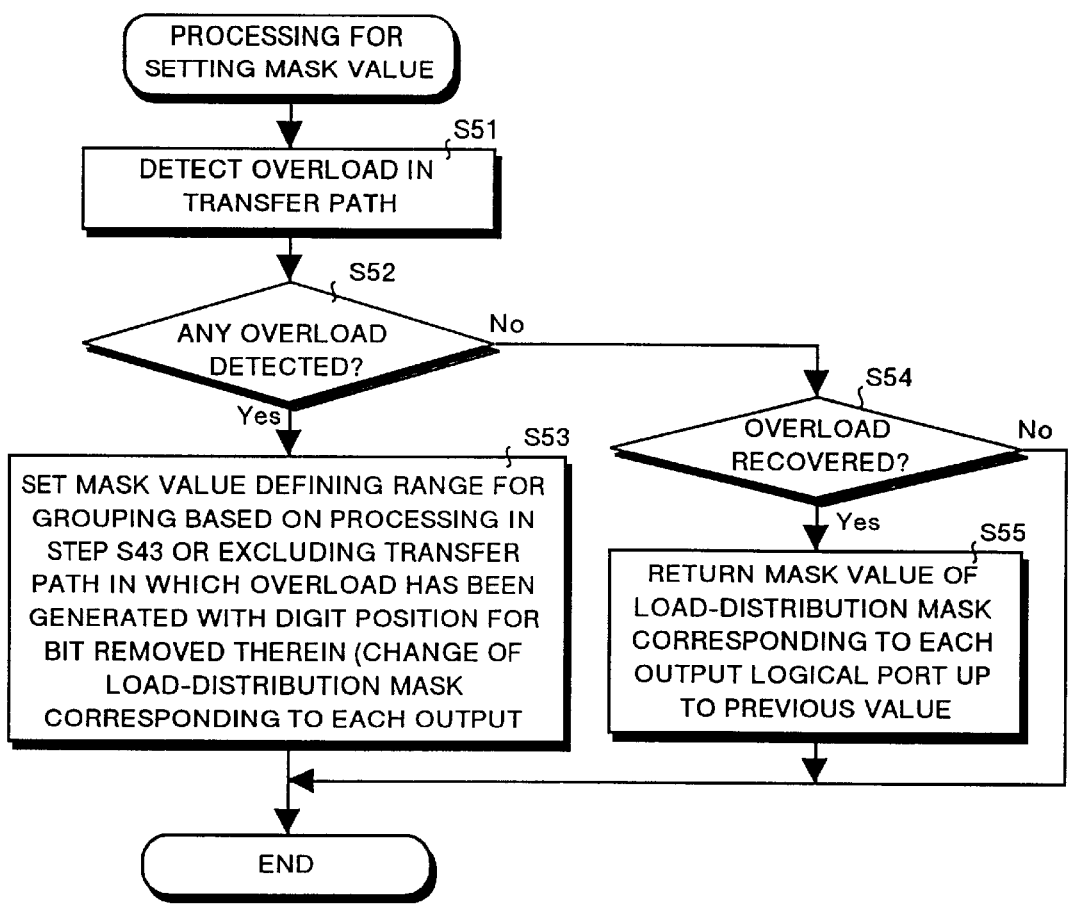
FIG. 48 is a flow chart for explaining a sequence of setting a mask value according to Embodiment 8.
Figure 49:
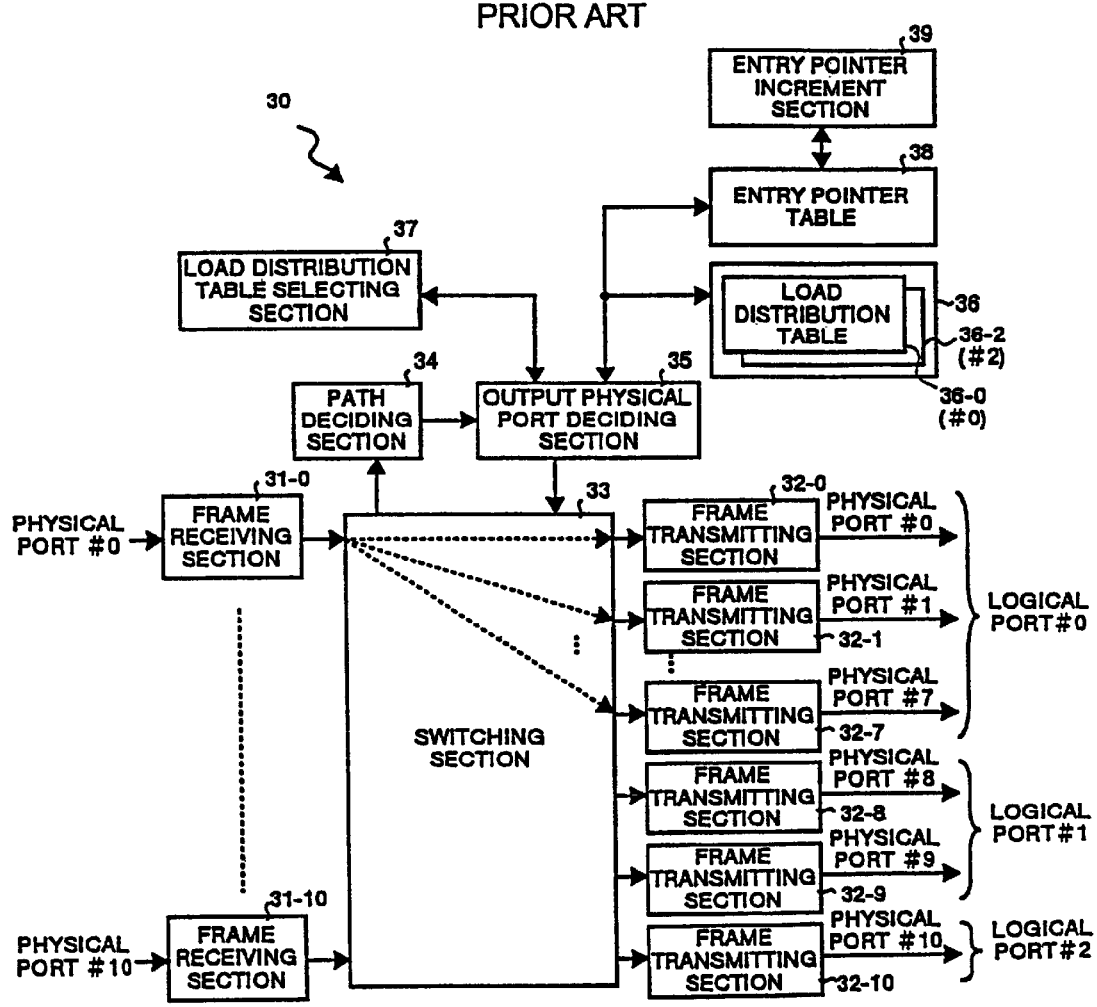
FIG. 49 is a block diagram showing configuration of a transmission equipment based on the conventional technology.
Figure 50:
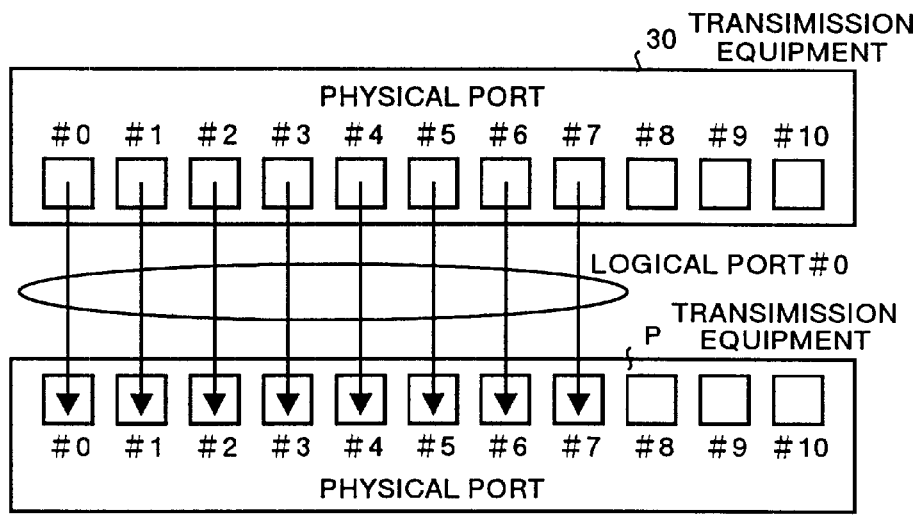
FIG. 50 is a simulated view for explaining a load-distribution transmitting method in the normal operation of the equipment according to the example based on the conventional technology.
Figure 51:
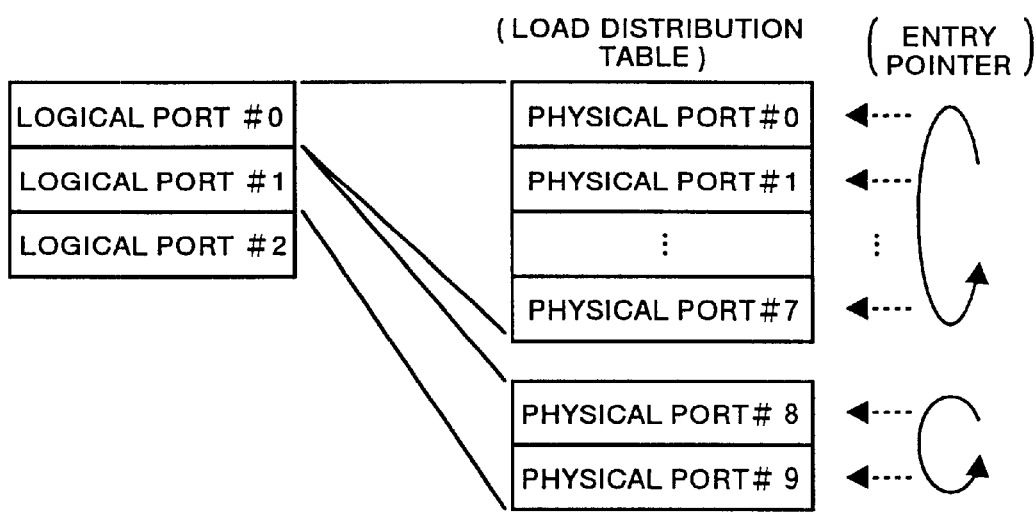
FIG. 51 is a view for explaining a method of changing an output physical port in the condition shown in FIG. 50.
Figure 52:
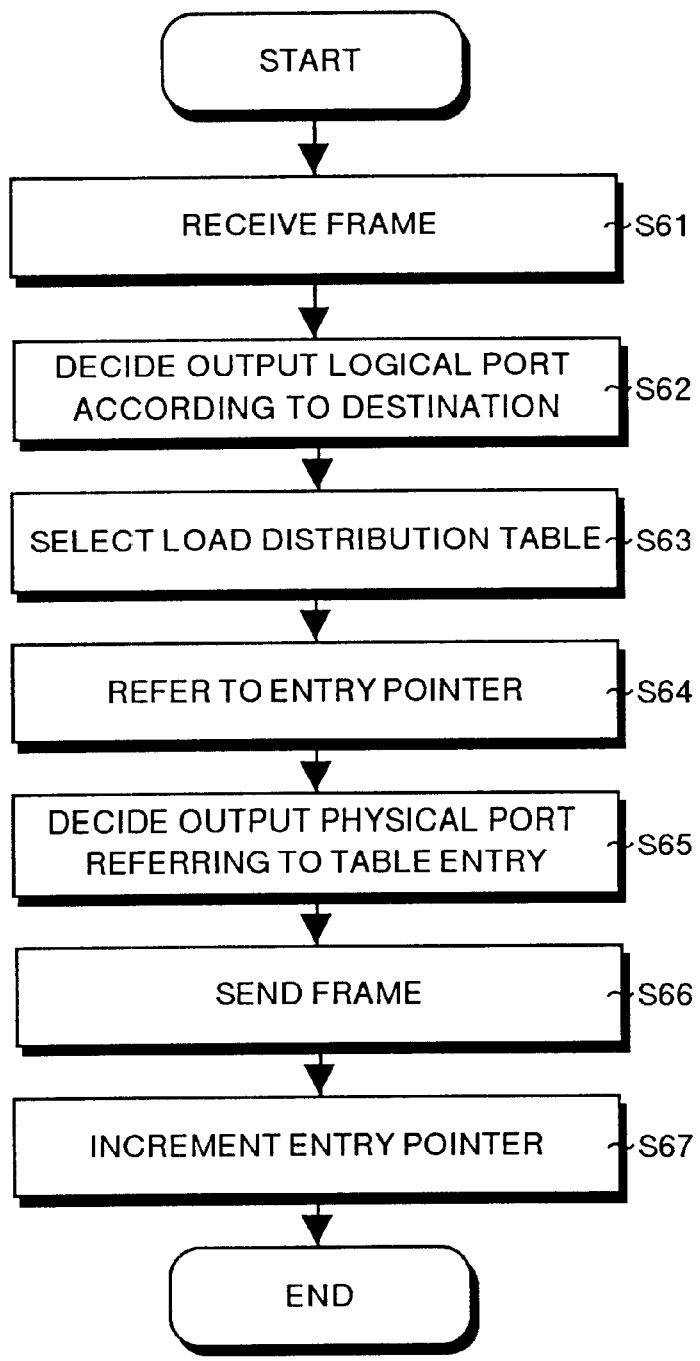
FIG. 52 is a flow chart for explaining a sequence of load-distribution transmission according to the example based on the conventional technology.

Description is made herein only for the operations different from those in Embodiment 7. FIG. 44 is a simulated view for explaining a load-distribution transmitting method at a time some overload occurs according to Embodiment 8, FIG. 45 is a view for explaining a method of changing an output physical port in the condition shown in FIG. 44, FIG. 46 is a simulated view for explaining a load-distribution transmitting method at a time other overload occurs, FIG. 47 is a view for explaining a method of changing an output physical port in the condition shown in FIG. 46, and FIG. 48 is a flow chart for explaining a sequence of setting a mask value.

Also in Embodiment 8, when a first overload occurs, it is possible to acquire a mask value for defining a grouping within a range including ports with a smaller number than the port number of the output physical port in which the overload occurs like in the example of FIG. 39 explained in Embodiment 7. Description is made for the acquisition of the mask value with reference to FIG. 44 and FIG. 45. FIG. 44 shows, concerning a logical port #0, a grouping defining ports as a range including up to a port (#3) in the further forward part (ports with smaller numbers) from an output physical port (#5) in which an overload occurs. The band for transfer paths is degraded when the first overload occurs. In this case, the range reduced from eight ports of the output physical ports #0 and #7 in the normal operation to four ports #0 to #3 is a range (object) of grouping. This range of grouping is defined with the mask value in an output physical port table shown in FIG. 45.

Figure 45:
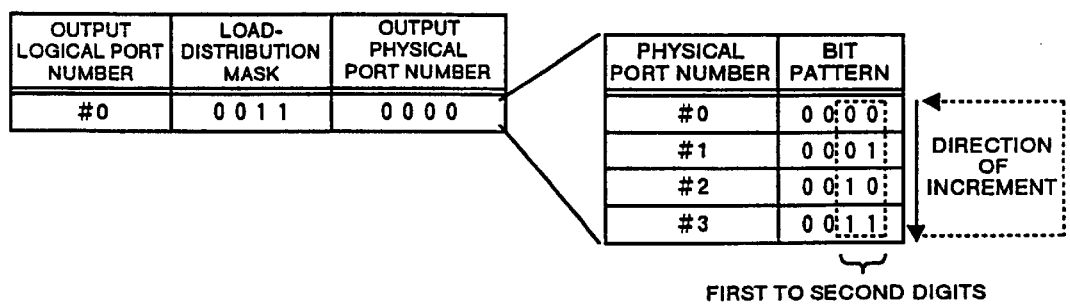
FIG. 45 is a view for explaining a method of changing an output physical port in the condition shown in FIG. 44.

FIG. 45 shows a portion of the output physical port table when only the mask value is changed in the correlation between the output logical port number and the load-distribution mask in the normal operation. This change is executed so that the grouping can be set, by avoiding the output physical port #5 in which an overload occurs, within a range of ports with smaller numbers than the output physical port #5.

In FIG. 45, a mask value "0011" (binary) of a load-distribution mask and an initial value "0000" (binary) of an output physical port are correlated to the output logical port #0 and stored in the table. Namely, to realize degradation in a band of transfer paths according to occurrence of the first overload, as shown in FIG. 45, the mask value is required to delete a valid bit in a higher order digit among valid bits in the mask value in the normal operation. The mask value "0011" (binary) of the load-distribution mask indicates a range in which all bits in the first and second digits are variable. For this reason, in the range for grouping transfer paths shown in FIG. 44, switching of ports is executed together with each frame transmission in association with each operation of incrementing a port number within the output physical ports #0 to #3.

To further detail here about the operations of increment shown in FIG. 45, in a case of the mask value "0011" (binary), two bits comprising the first and second digits may be incremented one by one from "00" (binary). Namely, changes according to the increment are "00" (binary)-"01" (binary) -"10" (binary)-"11" (binary). Simply considering only those two bits, values obtained by the increment are changed like 0 -1-2-3. Then, if the other two fixed bits (in the two higher order digits) are included in each of the values, the values obtained by the increment are changed like 0-1-2-3. Accordingly, the output physical port numbers obtained by the increment are #0-#1-#2-#3.

As described above, in the range of grouping shown in FIG. 44, frame transmission to the output physical port (#5) in which an overload occurs within the range of grouping in the normal operation is not executed, and for this reason, even if the band for transfer paths is reduced, load-distribution transmission can surely be realized.

Also, the change of a mask value can deal with a case where an overload occurs not only in one output physical port but also in each of a plurality of output physical ports. Namely, the range of grouping in FIG. 44 is possibly moved by changing the mask value. In this case, the mask value of the load-distribution mask may be changed to a mask value defining a grouping in a range obtained by avoiding a plurality of output physical ports each in which an overload occurs.

Next description is made for changing a mask value according to occurrence of a plurality of overload with reference to FIG. 46 and FIG. 47. FIG. 46 shows, concerning a logical port #0, a grouping defining a range obtained by avoiding each of output physical ports (#1, #5) each in which an overload occurs within the original range of grouping in the normal operation, which is different from the connected relation between the transmission equipment 8 and the transmission equipment P as a partner shown in FIG. 44. This grouping indicates degradation as well as change of the band for transfer paths. In this case, the range in which four ports of the output physical ports #0 to #3 are changed to ports #2, #3, #6 and #7 is a range (object) of grouping. This range of grouping is defined with the mask value in an output physical port table shown in FIG. 47.

FIG. 47 shows a portion of the output physical port table when only the mask value is further changed in the correlation between the output logical port number and the load-distribution mask shown in FIG. 45. This change is executed so that a load-shareable grouping can be set, by avoiding the output physical ports #5 and #1 each in which an overload occurs, within the original range of grouping.

In FIG. 47, a mask value "0101" (binary) of a load-distribution mask and an initial value "0000" (binary) of an output physical port are correlated to the output logical port #0 and stored in the table. Namely, to realize degradation and change in a band of transfer paths according to occurrence of an overload, as shown in FIG. 47, the mask value is required to set (including deletion) valid bits of the number of valid bits (in three lower order digits) in the normal operation. The mask value "0101" (binary) of the load-distribution mask obtained as a result indicates a range in which bits in the first and third digits are variable For this reason, in the range for grouping transfer paths shown in FIG. 46, switching of ports is executed together with each frame transmission in association with each operation of incrementing a port number within the output physical ports #2, #3, #6 and #7.

To further detail here about the operations of increment shown in FIG. 47, in a case of the mask value "0101" (binary), two bits comprising the first and third digits may be incremented one by one from "00" (binary). Namely, changes according to the increment are "00" (binary)-"01" (binary) -"10" (binary) "11" (binary). Simply considering only those two bits, values obtained by the increment are changed like 0 -1-2-3, but if the other two fixed bits (in the second and fourth digits) are included in each of the values, the values obtained by the increment are changed like 2-3-6-7. Accordingly, the output physical port numbers obtained by the increment are #2-#3-#6-#7.

As described above, in the range of grouping shown in FIG. 46, frame transmission to the output physical port (#2) in which a further overload occurs within the original range of grouping shown in the normal operation is not executed, and for this reason, even if a band for transfer paths to be used is changed within the original band, load-distribution transmission can surely be realized.

Concrete description is made for the operations for setting a mask value with reference to FIG. 48. The processing for setting a mask value described below is executed with an overload or elimination of an overload thereof as one of triggers. When an overloaded state is detected in one of output physical port numbers by the overload detecting section 22 (step S51), determination is made as to whether the loaded state indicates an overload, elimination of an overload thereof, or a balanced state. If an overload is detected (step S52), information on the overload and an output physical port number in which the overload has been detected are reported to the mask value setting section 17. Then, the processing shifts to step S53.

In step S53, a mask value with which a range for grouping ports with numbers smaller than the smallest port number of the output physical port numbers each in which an overload occurs so far can be defined is set in the mask value setting section 17 according to the output physical port number(s) when the first overload occurs as shown in FIG. 44, and a pair of the mask value (load-distribution mask) and the output physical port number corresponding to the mask value are supplied to the output physical port table 16. With those operations, the mask value is changed in the output physical port table 16.

Or, a mask value with which a range of grouping can be defined within the original range of grouping in the normal operation by avoiding any output physical port numbers each in which an overload occurs so far is set in the mask value setting section 17 according to the output physical port number(s) when a plurality of overload occur as shown in FIG. 46, and a pair of the mask value (load-distribution mask) and the output physical port number corresponding to the mask value are supplied to the output physical port table 16. With those operations, the mask value is changed in the output physical port table 16.

Also, if elimination of an overload but not the overload is detected (step S54), the processing shifts to step S55, while if a balanced state but neither an overload nor elimination of an overload thereof is detected (step S54), this processing for setting a mask value is ended.

In step S55, a mask value with which the range for grouping effected when this eliminated output physical port number has been used can be defined is set in the mask value setting section 17 according to the output physical port number(s) in which the overload having occurred as shown in FIG. 44 or FIG. 46 is eliminated, and a pair of the mask value (load-distribution mask) and the output physical port number corresponding to the mask value are supplied to the output physical port table 16. With those operations, the mask value is changed in the output physical port table 16.

It should be noted that, in the step S55, there are some cases where the mask value is not always returned to the previous mask value, but is further changed, or the number of digits is increased within the original range of grouping according to the state of elimination. For example, in the overloaded state as shown in FIG. 46, the mask value is not returned to the range of grouping shown in FIG. 44 unless an overload of the output physical port #1 which is the smaller number is eliminated even if an overload of the output physical port #5 is eliminated.

As described above, with Embodiment 8, in addition to the effects in common with Embodiment 7, the mask information is changed to mask information for defining a range of grouping obtained by excluding digit positions for bits, of a bit pattern expressed with mask information corresponding to each of output logical ports, corresponding to at least one or a plurality of output physical ports each in which and overloaded state is detected, so that it is possible to acquire a grouping to which no output physical port in an overloaded state belongs.

In each of the embodiments, a table previously correlating mask values to output physical ports may be provided and in this case, it is possible to set a required output physical port number as an object for grouping by changing the mask value.

In Embodiments 4 to 8, the change (setting) of definition concerning equipment configuration, communication trouble, or an overload are explained as an example as a trigger to change (set) the mask value. The present invention includes a combination of two or more of those trigger detecting mechanisms.

Although the invention has been described with respect to specific embodiments 1 to 8 for a clear and a complete disclosure, the appended claims are not to be thus limited but are to be construed as embodying all modifications and alternative constructions that may occur to one skilled in the art which fairly fall within the basic teaching herein set forth.

As described above, with the transmission equipment according to the present invention, when received frames are to successively be transmitted, change of an output physical port is regularly executed within a plurality of output physical ports corresponding to an output logical port acquired from destination information, so that it is possible to omit operations to look up a table each time when an output physical port with which a load is distributed is changed and realize speed-up of load-distribution transmission in this case, and in addition, it is not required to insure resources constituting tables for the look-up, and for this reason, it is possible to obtain a transmission equipment enabling realization of a compact circuit for load-distribution transmission.

With the transmission equipment according to the present invention, a plurality of output physical port numbers corresponding to an output logical port number acquired from destination information and mask information for varying any output physical port number of the plurality of output physical port numbers for load distribution are acquired by looking up an output physical port table, and when received frames are to successively be transmitted, change of an output physical port number is executed within a plurality of output physical port numbers corresponding to an output logical port acquired from the destination information, so that it is possible to omit operations to look up a table each time when an output physical port with which a load is distributed is changed and realize speed-up of load-distribution transmission in this case, and in addition, it is not required to insure resources constituting tables for the look-up, and for this reason, it is possible to obtain a transmission equipment enabling realization of a compact circuit for load-distribution transmission.

With the transmission equipment according to the present invention, a plurality of output physical port numbers (numbers each obtained by combining a board number of an interface board and a port number in a plurality of interface boards corresponding to the board number) corresponding to an output logical port number acquired from destination information and mask information for varying any output physical port number of the plurality of output physical port numbers for load distribution are acquired by looking up an output physical port table, and when received frames are to successively be transmitted, change of an output physical port number is executed according to the mask information within a plurality of output physical port numbers corresponding to the output logical port number acquired from the destination information, so that, even when a plurality of ports are provided in each of a plurality of interface boards respectively, it is possible to omit operations to look up a table each time when an output physical port with which a load is distributed is changed and realize speed-up of load-distribution transmission in this case, and in addition, it is not required to insure resources constituting tables for the look-up, and for this reason, it is possible to obtain a transmission equipment enabling realization of a compact circuit for load-distribution transmission.

With the transmission equipment according to the present invention, an output physical port number is changed within a range for grouping defined by mask information, so that it is possible to obtain a transmission equipment enabling realization of load-distribution transmission in an adequate band insured by the grouping.

With the transmission equipment according to the present invention, output physical port numbers are changed in ascending order or in descending order within a range for grouping, so that it is possible to obtain a transmission equipment enabling acquisition of an output physical port number with regularity in changes within the range for grouping as well as a simple operational sequence.

With the transmission equipment according to the present invention, an output physical port number and mask information each comprise the same number of bits, and a digit position to be variable is specified with each of the mask information to a bit pattern of an output physical port number corresponding to the mask information, so that only an output physical port obtained by change of the digit position to be variable is used, and with this operation, it is possible to obtain a transmission equipment enabling realization of load-distribution transmission using any output physical port which is surely desired.

With the transmission equipment according to the present invention, mask information corresponding to each of output logical ports is changed and set to mask information for defining a range to insure a band for a transfer path adequate for changed contents of the definition concerning equipment configuration from the range of grouping according to the mask information, so that flexibility can be given to grouping according to the changed contents of the definition on the equipment configuration, and with this operation, it is possible to obtain a transmission equipment enabling higher efficiency of load-distribution transmission.

With the transmission equipment according to the present invention, a range of grouping is enlarged or reduced according to changed conditions of definition concerning equipment configuration, so that a band to be insured can be enlarged or reduced according to enlargement or reduction of the grouping range, and with this operation, it is possible to obtain a transmission equipment enabling higher efficiency of load-distribution transmission.

With the transmission equipment according to the present invention, mask information corresponding to each of output logical ports is changed and set to mask information for defining a range in which one or a plurality of output physical ports each with communication trouble having been detected are invalidated from the range of grouping according to the mask information, so that any output physical port in which communication trouble occurs can be separated from others, and with this operation, it is possible to obtain a transmission equipment enabling sure avoidance of communication trouble at the time of load-distribution transmission.

With the transmission equipment according to the present invention, mask information corresponding to each of output logical ports is changed and set to mask information for defining a range in which one or a plurality of output physical ports each in which an overloaded state has been detected are invalidated from the range of grouping according to the mask information, so that any output physical port at the overloaded state can be separated from others, and with this operation, it is possible to obtain a transmission equipment enabling uniformity of a load at the time of load-distribution transmission.

With the transmission equipment according to the present invention, mask information corresponding to each of output logical ports is changed to mask information for defining a range of grouping excluding digit positions therefrom corresponding to at least one or a plurality of output physical ports in which any communication trouble has been detected, so that it is possible to obtain a transmission equipment enabling acquisition of a grouping to which any output physical port having communication trouble does not belong.

With the transmission equipment according to the present invention, mask information corresponding to each of output logical ports is changed to mask information for defining a range with digit positions obtained by moving from the digit positions corresponding to at least one or a plurality of output physical ports in which communication trouble has been detected as a range of grouping, so that it is possible to obtain a transmission equipment enabling acquisition of a grouping which does not include any output physical port having communication trouble.

With the transmission equipment according to the present invention, when recovery from communication trouble is detected, mask information is returned to the original mask information corresponding to each of the output logical ports, so that a correlation between the output logical port and the mask information can be returned to the initial state before the communication trouble occurs, and with this operation, it is possible to obtain a transmission equipment enabling automatic recovery of the system on the whole from trouble.

With the transmission equipment according to the present invention, when elimination of an overloaded state is detected, mask information is returned to the original mask information corresponding to each of output logical ports, so that a correlation between the output logical port and the mask information can be returned to the initial state before the overload occurs, and with this operation, it is possible to obtain a transmission equipment enabling automatic recovery of the system on the whole from an overload.

With the load-distribution transmitting method according to the present invention, when received frames are to successively be transmitted, the method comprises a step of regularly executing change of an output physical port in a plurality of output physical ports each corresponding to an output logical port acquired from destination information, so that it is possible to omit operations to look up a table each time when an output physical port with which a load is distributed is changed and realize speed-up of load-distribution transmission in this case, and in addition, it is not required to insure resources constituting tables for the look-up, and for this reason, it is possible to obtain a transmission equipment enabling realization of a compact circuit for load-distribution transmission.

This application is based on Japanese patent application No. HEI 9-279200 filed in the Japanese Patent Office on Oct. 13, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A transmission equipment connected to a network for executing communications using a frame including destination information with a plurality of I/O physical ports for transmitting a frame transmission through said network via said plurality of I/O physical ports; said transmission equipment comprising:

an output physical port table for storing therein a variable output physical port number for identifying any output physical port by correlating to each of a plurality of previously decided output logical port numbers respectively and mask information for changing said variable output physical port number to distribute loads;

an output logical port deciding unit for deciding an output logical port according to the destination information, when a frame has been received from said network, included in said received frame;

an output physical port deciding unit for deciding an output physical port number corresponding to the output logical port number decided by said output logical port deciding unit by referring to said output physical port table;

a frame transmitter for transmitting said received frame to the output physical port having an output physical port number decided by said output physical port deciding unit; and an output physical port changing unit for changing any output physical port number decided by said output physical port deciding unit according to the mask information correlated to the output logical port number decided by said output logical port deciding unit by referring to said output physical port table when received frames following the frame transmitted by said frame transmitter are successively transmitted.

2. A transmission equipment according to claim 1; wherein said mask information defines a range for grouping a plurality of output physical port numbers, and said output physical port changing unit changes the output physical port number decided by said output physical port deciding unit within the range for grouping defined by said mask information.

3. A transmission equipment according to claim 2; wherein said output physical port changing unit changes output physical port numbers in ascending order or in descending order within the range for said grouping.

4. A transmission equipment according to claim 2; wherein output physical port numbers and mask information stored in said output physical port table are numbers indicated with the same number of digits, and each of said mask information is information for identifying a digit position to be variable for said output physical port number correlated to the mask information.

5. A transmission equipment according to claim 2 further comprising:

an equipment-configuration defining detector for detecting change in definition concerning equipment configuration for the equipment; and a mask information setting unit for changing and setting, when the definition concerning the equipment configuration for said equipment is changed by said equipment-configuration defining detector, mask information corresponding to each of said output logical ports to mask information for defining a range to insure a band for transfer paths adequate for changed contents of said definition concerning the equipment configuration from the range of grouping according to the mask information.

6. A transmission equipment according to claim 5, wherein said mask information setting unit enlarges and reduces said range of grouping so as to be a range for obtaining a band according to said changed conditions.

7. A transmission equipment according to claim 2 further comprising:

a communication trouble detector for detecting trouble over communications for each output physical port; and a mask information setting unit for changing and setting, when one or a plurality of output physical ports having trouble over communications are detected by said communication trouble detector, mask information corresponding to each of said output logical ports to mask information for defining a range in which said detected one or a plurality of output physical ports have been invalidated from the range of grouping according to the mask information.

8. A transmission equipment according to claim 2 further comprising:

an overload detector for detecting an overloaded state in each output physical port; and a mask information setting unit for changing and setting, when one or a plurality of output physical ports each in an overloaded state are detected by said overload detector, mask information corresponding to each of said output logical ports to mask information for defining a range in which said detected one or a plurality of output physical ports have been invalidated from the range of grouping according to the mask information.

9. A transmission equipment according to claim 2; wherein said mask information setting unit changes mask information corresponding to each of said output logical ports to mask information for defining a range of grouping excluding digit positions therefrom corresponding to at least said detected one or a plurality of output physical ports.

10. A transmission equipment according to claim 7; wherein said mask information setting unit changes mask information corresponding to each of said output logical ports to mask information for defining a range with digit positions obtained by moving from the digit positions corresponding to at least said detected one or a plurality of output physical ports as a range of grouping.

11. A transmission equipment according to claim 7; wherein said communication trouble detector includes recovery from communication troubles in contents to detect thereby, and said mask information setting unit returns, when recovery from communication trouble is detected by said communication trouble detector, the mask information to the original mask information corresponding to each of said output logical ports.

12. A transmission equipment according to claim 8; wherein said mask information setting unit changes mask information corresponding to each of said output logical ports to mask information for defining a range of grouping excluding digit positions therefrom corresponding to at least said detected one or a plurality of output physical ports.

13. A transmission equipment according to claim 8; wherein said mask information setting unit changes mask information corresponding to each of said output logical ports to mask information for defining a range with digit positions obtained by moving from the digit positions corresponding to at least said detected one or a plurality of output physical ports.

14. A transmission equipment according to claim 8; wherein said overload detector includes elimination of an overload in contents to detect thereby, and said mask information setting unit returns, when elimination of an overloaded state is detected by said overload detector, the mask information to the original mask information corresponding to each of said output logical ports.

15. A transmission equipment connected to a network for executing communications using a frame including destination information with a plurality of I/O physical ports for transmitting a frame transmission through said network via said plurality of I/O physical ports; said transmission equipment comprising:

an output physical port table with one or a plurality of interface boards each correlated to each of a plurality of previously decided output logical ports provided therein, with a plurality of interface board-ports each provided in each of said interface boards, for deciding a number obtained by combining a board number for each of said interface boards with a corresponding number for a port in each of said plurality of interface boards as an output physical port number, and storing therein a variable output physical port number for identifying any output physical port corresponding to each of said plurality of output logical port numbers and mask information for changing said variable output physical port number to distribute loads;

an output logical port deciding unit for deciding an output logical port number according to the destination information, when a frame has been received from said network, included in said received frame;

an output physical port deciding unit for deciding an output physical port number corresponding to the output logical port number decided by said output logical port deciding unit by referring to said output physical port table;

a frame transmitter for transmitting said received frame to the output physical port having an output physical port number decided by said output physical port deciding unit; and an output physical port changing unit for changing any output physical port number decided by said output physical port deciding unit according to the mask information correlated to the output logical port number decided by said output logical port deciding unit by referring to said output physical port table when received frames following the frame transmitted by said frame transmitter are successively transmitted.

16. A transmission equipment according to claim 15; wherein said mask information defines a range for grouping a plurality of output physical port numbers, and said output physical port changing unit changes the output physical port number decided by said output physical port deciding unit within the range for grouping defined by said mask information.

17. A transmission equipment according to claim 16; wherein said output physical port changing unit changes output physical port numbers in ascending order or in descending order within the range for said grouping.

18. A transmission equipment according to claim 16; wherein output physical port numbers and mask information stored in said output physical port table are numbers indicated with the same number of digits, and each of said mask information is information for identifying a digit position to be variable for said output physical port number correlated to the mask information.

19. A transmission equipment according to claim 16 further comprising:

an equipment-configuration defining detector for detecting change in definition concerning equipment configuration for the equipment; and a mask information setting unit for changing and setting, when the definition concerning the equipment configuration for said equipment is changed by said equipment-configuration defining detector, mask information corresponding to each of said output logical ports to mask information for defining a range to insure a band for transfer paths adequate for changed contents of said definition concerning the equipment configuration from the range of grouping according to the mask information.

20. A transmission equipment according to claim 19, wherein said mask information setting unit enlarges and reduces said range of grouping so as to be a range for obtaining a band according to said changed conditions.

21. A transmission equipment according to claim 16 further comprising:

a communication trouble detector for detecting trouble over communications for each output physical port; and a mask information setting unit for changing and setting, when one or a plurality of output physical ports having trouble over communications are detected by said communication trouble detector, mask information corresponding to each of said output logical ports to mask information for defining a range in which said detected one or a plurality of output physical ports have been invalidated from the range of grouping according to the mask information.

22. A transmission equipment according to claim 16 further comprising:

an overload detector for detecting an overloaded state in each output physical port; and a mask information setting unit for changing and setting, when one or a plurality of output physical ports each in an overloaded state are detected by said overload detector, mask information corresponding to each of said output logical ports to mask information for defining a range in which said detected one or a plurality of output physical ports have been invalidated from the range of grouping according to the mask information.

23. A transmission equipment according to claim 21; wherein said mask information setting unit changes mask information corresponding to each of said output logical ports to mask information for defining a range of grouping excluding digit positions therefrom corresponding to at least said detected one or a plurality of output physical ports.

24. A transmission equipment according to claim 21; wherein said mask information setting unit changes mask information corresponding to each of said output logical ports to mask information for defining a range with digit positions obtained by moving from the digit positions corresponding to at least said detected one or a plurality of output physical ports as a range of grouping.

25. A transmission equipment according to claim 21; wherein said communication trouble detector includes recovery from communication troubles in contents to detect thereby, and said mask information setting unit returns, when recovery from communication trouble is detected by said communication trouble detector, the mask information to the original mask information corresponding to each of said output logical ports.

26. A transmission equipment according to claim 22; wherein said mask information setting unit changes mask information corresponding to each of said output logical ports to mask information for defining a range of grouping excluding digit positions therefrom corresponding to at least said detected one or a plurality of output physical ports.

27. A transmission equipment according to claim 22; wherein said mask information setting unit changes mask information corresponding to each of said output logical ports to mask information for defining a range with digit positions obtained by moving from the digit positions corresponding to at least said detected one or a plurality of output physical ports.

28. A transmission equipment according to claim 22; wherein said overload detector includes elimination of an overload in contents to detect thereby, and said mask information setting unit returns, when elimination of an overloaded state is detected by said overload detector, the mask information to the original mask information corresponding to each of said output logical ports.

29. A load-distribution transmitting method in a transmission equipment connected to a network for executing communications using a frame including destination information with a plurality of I/O physical ports for transmitting a frame transmission through the network via the plurality of I/O physical ports, comprising:

generating an output physical port table which stores therein a variable output physical port number for identifying any output physical port by correlating to each of a plurality of previously decided output logical port numbers respectively and mask information for changing the variable output physical port number to distribute loads;

deciding an output logical port according to the destination information, when a frame has been received from the network, included in the received frame;

deciding an output physical port number corresponding to the output logical port number decided in said output logical port deciding by referring to the output physical port table;

transmitting the received frame to the output physical port having an output physical port number decided in said output physical port deciding; and changing any output physical port number decided in said output physical port deciding according to the mask information correlated to the output logical port number decided in said output logical port deciding by referring to the output physical port table when received frames following the frame transmitted in said frame transmitting are successively transmitted.

\* \* \* \* \*